US009722339B2

(12) United States Patent
Tamaki et al.

(10) Patent No.: US 9,722,339 B2
(45) Date of Patent: Aug. 1, 2017

(54) CONNECTOR AND METHOD OF MANUFACTURING SAME

(71) Applicant: HOSIDEN CORPORATION, Yao-shi (JP)

(72) Inventors: Fumitake Tamaki, Yao (JP); Hayato Kondo, Yao (JP)

(73) Assignee: HOSIDEN CORPORATION, Yao-shi (JP)

( * ) Notice: Subject to any disclaimer, the term of this patent is extended or adjusted under 35 U.S.C. 154(b) by 0 days.

(21) Appl. No.: 14/693,115

(22) Filed: Apr. 22, 2015

(65) Prior Publication Data
US 2015/0311617 A1 Oct. 29, 2015

(30) Foreign Application Priority Data

Apr. 23, 2014 (JP) ................................. 2014-089552

(51) Int. Cl.
| | |
|---|---|
| H01R 13/40 | (2006.01) |
| H01R 13/405 | (2006.01) |
| H01R 13/6476 | (2011.01) |
| H01R 24/60 | (2011.01) |
| B29C 45/14 | (2006.01) |
| H01R 107/00 | (2006.01) |
| B29L 31/36 | (2006.01) |

(Continued)

(52) U.S. Cl.
CPC ..... *H01R 13/405* (2013.01); *B29C 45/14418* (2013.01); *B29C 45/14549* (2013.01); *B29C 45/14639* (2013.01); *H01R 13/6476* (2013.01); *B29C 45/14467* (2013.01); *B29C 45/2628* (2013.01); *B29C 2045/14122* (2013.01); *B29L 2031/36* (2013.01); *H01R 24/60* (2013.01); *H01R 43/24* (2013.01); *H01R 2107/00* (2013.01)

(58) Field of Classification Search
CPC .... H01R 13/6473; H01R 13/42; H01R 13/41; H01R 43/16
USPC ............................ 439/660, 733.1, 736, 941
See application file for complete search history.

(56) References Cited

U.S. PATENT DOCUMENTS 5,795,191 A * 8/1998 Preputnick ........... H01R 23/688
439/108
7,462,924 B2 * 12/2008 Shuey ................ H01R 13/6471
257/666

(Continued)

FOREIGN PATENT DOCUMENTS

JP 2012-252904 A1 12/2012

*Primary Examiner* — Hien Vu
(74) *Attorney, Agent, or Firm* — Kratz, Quintos & Hanson, LLP

(57) ABSTRACT

A connector including a body, an adjacent pair of first terminals, a second terminal next to one of the first terminals, a third terminal next to the other first terminal, and a fourth terminal. The body holds the terminals at least partially and includes a first recess, a second recess, and a first separating portion therebetween. The first and third terminals each have a portion exposed through the first recess. The fourth terminal has a portion exposed through the second recess. The second terminal includes an exposed portion and an unexposed portion. The unexposed portion includes an area on one side in the first direction of a part in the second direction of the second terminal and is covered with the body. The exposed portion includes an area on the other side in the first direction of the part of the second terminal and is exposed through the first recess.

15 Claims, 9 Drawing Sheets

(51) Int. Cl.
*H01R 43/24* (2006.01)
*B29C 45/26* (2006.01)

(56) References Cited

U.S. PATENT DOCUMENTS

| | | | |
|---|---|---|---|
| 8,342,888 B2* | 1/2013 | Amleshi | H01R 13/514 |
| | | | 439/660 |
| 8,715,003 B2* | 5/2014 | Buck | H01R 12/73 |
| | | | 439/607.07 |
| 9,277,649 B2* | 3/2016 | Ellison | H01R 12/523 |

* cited by examiner

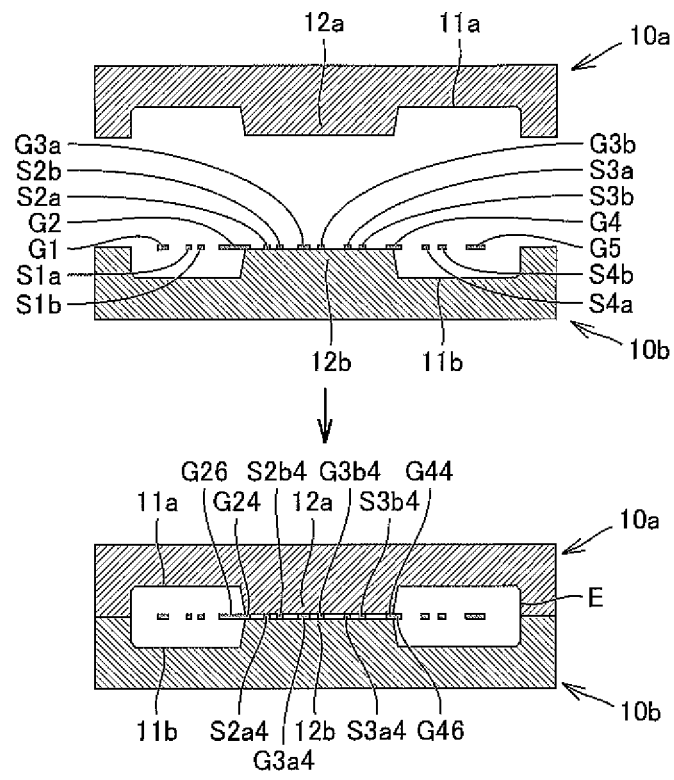
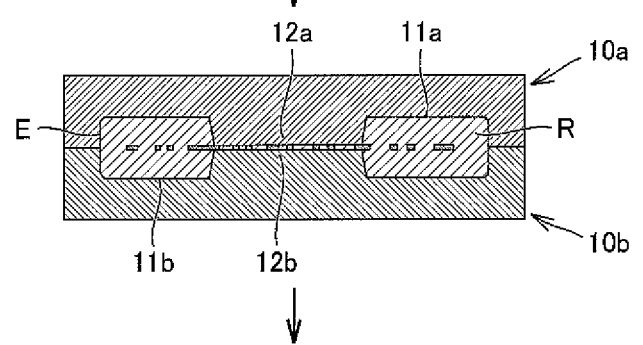
Fig.5A
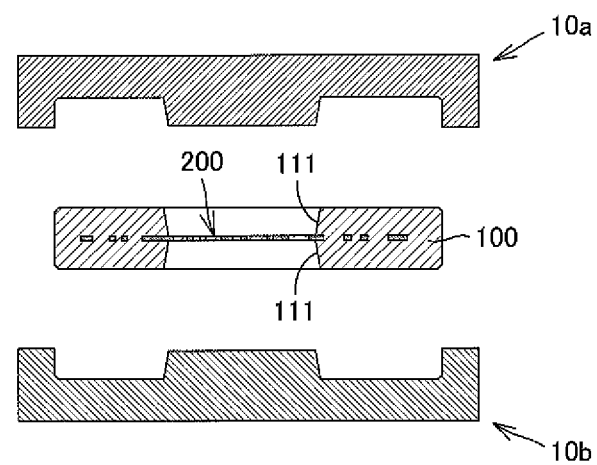

CONNECTOR AND METHOD OF MANUFACTURING SAME

CROSS-REFERENCE TO RELATED APPLICATIONS

The present application claims priority under 35 U.S.C. §119 of Japanese Patent Application No. 2014-089552 filed on Apr. 23, 2014, the disclosure of which is expressly incorporated by reference herein in its entity.

BACKGROUND OF THE INVENTION

Technical Field

The invention relates to connectors and methods of manufacturing the connectors.

Background Art

Japanese Unexamined Patent Publication No. 2012-252904 describes a conventional connector including a body of insulating plastic material and a plurality of terminals insert-molded in the body. The terminals include a pair of differential signal terminals, one of which is partially exposed through a recess in the body. The recess serves to adjust the amount of plastic material of the body around the one of the terminals and lower the dielectric constant of the materials around the one of the terminals in order to increase the transmission speed of signals transmitted by the pair of terminals.

SUMMARY OF INVENTION

The above recess is made by a protrusion of a mold used to insert-mold the terminals in the body. The protrusion of the mold presses the one of the terminals partially to suppress displacement of the one of the terminals due to flowing plastic material injected into the mold.

There are demands for suppressing displacement of a large number of terminals due to flowing plastic material during the insert-molding process. The demands may be met by forming a mold with an elongated projection extending in the direction of aligning the terminals so as to press the terminals partially. However, pressing the terminals with an elongated protrusion alone may degrade fluidity of the plastic material injected into the mold.

The invention is devised in view of the above circumstances and provides a connector with improved fluidity of plastic material during insert-molding process. The invention also provides a method of manufacturing the connector.

A connector in an aspect of the invention includes a body of an insulating plastic material, a pair of first terminals, a second terminal, a third terminal, and a fourth terminal. The body includes a first recess extending in a direction including a component of a first direction, a second recess extending in a direction including a component of the first direction, and a first separating portion between the first recess and the second recess. The first, second, third, and fourth terminals are held at least partially in the body and spaced from each other along the first direction. The first terminals are differential signal terminals being adjacent to each other and extending in a direction including a component of a second direction crossing the first direction. The first terminals each include a first exposed portion. The first exposed portion of each first terminal includes an entire area in the first direction of a first part in the second direction of the first terminal and is exposed to an outside of the body through the first recess thereof. The second terminal is a ground terminal or a low-speed signal terminal to transmit a signal at a lower speed than the first terminals. The second terminal extends in a direction including a component of the second direction so as to be located next to one of the first terminals on one side in the first direction. The second terminal includes a first unexposed portion and a first exposed portion. The first unexposed portion of the second terminal includes an area on one side in the first direction of a first part in the second direction of the second terminal and is covered with the body. The first exposed portion of the second terminal includes an area on the other side in the first direction of the first part of the second terminal and is exposed to the outside of the body through the first recess thereof. The third terminal is a ground terminal or a low-speed signal terminal to transmit a signal at a lower speed than the first terminals. The third terminal extends in a direction including a component of the second direction so as to be located next to the other first terminal on the other side in the first direction. The third terminal includes a first exposed portion. The first exposed portion of the third terminal includes at least an area on one side in the first direction of a first part in the second direction of the third terminal and is exposed to the outside of the body through the first recess thereof. The fourth terminal extends in a direction including a component of the second direction so as to be located on the one side in the first direction relative to the second terminal. The fourth terminal includes a first exposed portion. The first exposed portion of the fourth terminal includes an entire or partial area in the first direction of a first part in the second direction of the fourth terminal and is exposed to the outside of the body through the second recess thereof.

The connector in this aspect of the invention has at least the following technical features. First, it is possible when fabricating the connector to smooth the flow of the plastic material injected into a cavity of a mold to insert-mold the first, second, third, and fourth terminals in the body for the following reasons. The first separating portion of the body separates the first recess and the second recess of the body. During insert-molding process of the body, a first protrusion of the mold for forming the first recess of the body abuts on the first exposed portions of the first, second, and third terminals, and a second protrusion of the mold for forming the second recess of the body abuts on the first exposed portion of the fourth terminal. Between the first and second protrusions of the molds, there is a gap corresponding to the first separating portion of the body. The gap serves as a flow path for the plastic material, making it possible to improve the fluidity of the plastic material injected into the molds. Moreover, in the second terminal, the first unexposed portion including the area on one side of the first part of the second terminal is covered with the body, while the first exposed portion including the area on the other side of the first part of the second terminal is exposed to the outside of the body through the first recess thereof. This configuration can downsize the first recess in the first direction, as compared to the configuration that the entire area of the first part of the second terminal is exposed through the first recess. This downsizing of the first recess is contributed by the second recess. This is because of positional relation such that the first recess exposes the first exposed portion of the second terminal, and the second recess exposes the exposed portion of the fourth terminal located on the one side in the first direction relative to the second terminal. Therefore, the first separating portion between the first and second recesses can be upsized, which means that the gap (flow path for the plastic material) corresponding to the first separating portion widens, facilitating the flow of the plastic material through the gap. Second, it is possible to equalize electromagnetic waves from the one of the first terminals and electromagnetic waves from the other first terminal. This can be achieved with the following configuration. The first exposed portion of the second terminal located next to the one of the first terminals is exposed at a position next to the first exposed portion of the one of the first terminals, so that the first exposed portion of the second terminal can absorb electromagnetic waves from the first exposed portion of the one of the first terminals. Also, the first exposed portion of the third terminal located next to the other first terminal is exposed at a position next to the first exposed portion of the other first terminal, the first exposed portion of the third terminal can absorb electromagnetic waves from the first exposed portion of the other first terminal.

The second recess may be provided on one side in the second direction relative to the first recess of the body. The connector in this aspect of the invention makes it possible to further smooth the flow of the plastic material injected in the cavity of the mold. This is because the second recess is located on the one side in the second direction relative to the first recess, which means that the second protrusion of the mold is also located on the one side in the second direction relative to a first protrusion of the mold. This configuration facilitates the flow of the plastic material through the gap between the first and second protrusions.

The second terminal may further include a second exposed portion. The second exposed portion may include at least an area on the one side in the first direction of a second part of the second terminal. The second part may be on the one side in the second direction relative to the first part of the second terminal. The second exposed portion may be exposed to the outside of the body through the second recess thereof.

The connector in this aspect of the invention can reduce the possibility that the second terminal may be displaced by the flow of plastic material injected into the cavity of the mold. It is also possible to smooth the flow of the plastic material injected into the cavity of the mold. More particularly, during insert-molding process of the body, the first protrusion of the mold for making the first recess of the body abuts on the first exposed portions of the first, second, and third terminals, while the second protrusion of the mold for making the second recess of the body abuts on the second exposed portion of the second terminal and the first exposed portion of the fourth terminal. In other words, the first and second protrusions of the mold abut on different portions in the second direction (i.e. first and second exposed portions) of the second terminal, reducing the possibility that the plastic material may cause displacement of the second terminal. Moreover, the second protrusion that abuts on the second exposed portion of the second terminal is located on the one side in the second direction relative to the first protrusion that abuts on the first exposed portion of the second terminal. This configuration facilitates the flow of the plastic material through the gap between the first and second protrusions.

The first recess may include a pair of first recesses. One of the first recesses may be located in the body on one side in a third direction relative to the first, second, and third terminals. The third direction may cross the first direction and the second direction. The other first recess may be located in the body on the other side in the third direction relative to the first, second, and third terminals.

The connector in this aspect of the invention can reduce the possibility that the first terminals may be displaced by the flow of plastic material injected into the cavity of the mold. This is because the first, second, and third terminals are abutted from the one side in the third direction by a first protrusion of a mold for making one of the first recesses, and the first, second, and third terminals are abutted from the other side in the third direction by a first protrusion of a mold for making the other first recess.

The second recess may include a pair of second recesses. One of the second recesses may be located in the body on the one side in the third direction relative to the fourth terminal. The other second recess may be located in the body on the other side in the third direction relative to the fourth terminal. The first separating portion may include a pair of first separating portions. One of the first separating portions may be located between the one of the first recesses and the one of the second recesses, and the other first separating portion may be located between the other first recess and the other second recess.

The connector in this aspect of the invention can reduce the possibility that the fourth terminal may be displaced by the flow of plastic material injected into the cavity of the mold. This is because the fourth terminal is abutted from the one side in the third direction by a second protrusion of a mold for making the one of the second recesses, and the fourth terminal is abutted from the other side in the third direction by a second protrusion of a mold for making the other second recess.

The body may further include a third recess, extending in a direction including a component of the first direction, and a second separating portion between the first recess and the third recess. The fourth terminal may include a plurality of fourth terminals including at least one of the fourth terminals and a remaining fourth terminal. The at least one of the fourth terminals may be disposed on the one side in the first direction relative to the second terminal. The first exposed portion of the at least one of the fourth terminals may be exposed to the outside of the body through the second recess thereof. The first exposed portion of the remaining fourth terminal may be exposed to the outside of the body through the third recess thereof.

The connector in this aspect of the invention can reduce the possibility that the plurality of fourth terminals may be displaced by the flow of plastic material injected into the cavity of the mold and makes it possible to smooth the flow of the plastic material. More particularly, during insert-molding process of the body, the second protrusion of the mold for making the second recess of the body abuts on the at least one of the fourth terminals, and the third protrusion of the mold for making the third recess of the body abuts on the remaining fourth terminal, reducing the possibility that the plastic material may cause displacement of the fourth terminals. Moreover, between the first and second protrusions of the molds, there is a gap corresponding to the first separating portion of the body; and between the first protrusion and the third protrusion of the mold, there is a gap corresponding to the second separating portion of the body. These gaps allow the plastic material to flow path for the plastic material, making it possible to improve the fluidity of the plastic material injected into the molds.

The third recess may be provided in the body on one or the other side in the second direction relative to the first recess. The connector in this aspect of the invention makes it possible to further smooth the flow of the plastic material injected in the cavity of the mold. This is because the third recess is located on the one side or the other side in the second direction relative to the first recess, which means that the third protrusion of the mold is also located on the one side or the other side in the second direction relative to the first protrusion. This configuration facilitates the flow of the plastic material through the gap between the first and third protrusions.

The third recess may include a pair of third recesses. One of the third recesses may be located in the body on the one side in the third direction relative to the remaining fourth terminal, and the other third recess may be located in the body on the other side in the third direction relative to the remaining fourth terminal. The second separating portion may include a pair of second separating portions. One of the second separating portions may be located between the one of the first recesses and the one of the third recesses, and the other second separating portion may be located between the other first recess and the other third recess.

The connector in this aspect of the invention can reduce the possibility that the remaining fourth terminal may be displaced by the flow of plastic material injected into the cavity of the mold. This is because the third protrusion of the mold for making the one of the third recesses abuts on the remaining fourth terminal from the one side in the third direction, and the third protrusion of the mold for making the other third recess abuts on the remaining fourth terminal from the other side in the third direction.

The first exposed portion of the third terminal may include an entire area in the first direction of the first part of the third terminal. The connector may further include a pair of fifth terminals, a sixth terminal, and a seventh terminal. The fifth terminals may be differential signal terminals being adjacent to each other and extending in a direction including a component of the second direction. The fifth terminals may each include a first exposed portion. The first exposed portion of each fifth terminal may include an entire area in the first direction of a first part in the second direction of the fifth terminal and may be exposed to the outside of the body through the first recess thereof. The sixth terminal may be a ground terminal or a low-speed signal terminal to transmit a signal at a lower speed than the first and fifth terminals. The sixth terminal may extend in a direction including a component of the second direction so as to be located between one of the fifth terminals on one side in the first direction and the third terminal. The sixth terminal may include a first exposed portion. The first exposed portion of the sixth terminal may include an entire area in the first direction of a first part in the second direction of the sixth terminal and may be exposed to the outside of the body through the first recess thereof. The seventh terminal may be a ground terminal or a low-speed signal terminal to transmit a signal at a lower speed than the first terminals. The seventh terminal may extend in a direction including a component of the second direction so as to be located next to the other fifth terminal on the other side in the first direction. The seventh terminal may include a first exposed portion and a first unexposed portion. The first exposed portion of the seventh terminal may include an area on the one side in the first direction of a first part in the second direction of the seventh terminal and may be exposed to the outside of the body through the first recess thereof. The first unexposed portion of the seventh terminal may include an area on the other side in the first direction of the first part of the seventh terminal and is covered with the body.

The connector in this aspect of the invention makes it possible to smooth the flow of the plastic material injected in the cavity of the mold to insert-mold the first to seventh terminals. This is because the first exposed portion including the area on the one side of the first part of the seventh terminal is exposed to the outside of the body through the first recess, while the first unexposed portion including the area on the other side of the first part of the seventh terminal is covered with the body. This configuration can downsize the first recess in the first direction, as compared to the configuration that the entire area of the first part of the seventh terminal is exposed through the first recess. The connector in this aspect of the invention can also equalize electromagnetic waves from the one of the fifth terminals and electromagnetic waves from the other fifth terminal. This can be achieved with the following configuration. The first exposed portion of the sixth terminal located next to the one of the fifth terminals is exposed at a position next to the first exposed portion of the one of the fifth terminals, so that the first exposed portion of the sixth terminal can absorb electromagnetic waves from the first exposed portion of the one of the fifth terminals. Also, the first exposed portion of the seventh terminal located next to the other fifth terminal is exposed at a position next to the first exposed portion of the other fifth terminal, so that the first exposed portion of the seventh terminal can absorb electromagnetic waves from the first exposed portion of the other fifth terminal.

The sixth terminal may be omitted. In this case, the third terminal may be disposed between the other first terminal and one fifth terminal of the fifth terminals on the one side in the first direction.

The connector in this aspect of the invention makes it possible to smooth the flow of the plastic material injected in the cavity of the mold to insert-mold the first to fifth terminals and the seventh terminal. This is because the first exposed portion including the area on the one side of the first part of the seventh terminal is exposed to the outside of the body through the first recess thereof, while the first unexposed portion including the area on the other side of the first part of the seventh terminal is covered with the body. This configuration can downsize the first recess in the first direction, as compared to the configuration that the entire area of the first part of the seventh terminal is exposed through the first recess. The connector in this aspect of the invention can also equalize electromagnetic waves from the one of the fifth terminals and electromagnetic waves from the other fifth terminal. This can be achieved with the following configuration. The first exposed portion of the third terminal located next to the one of the fifth terminals is exposed at a position next to the first exposed portion of the one of the fifth terminals, so that the first exposed portion of the third terminal can absorb electromagnetic waves from the first exposed portion of the one of the fifth terminals. Also, the first exposed portion of the seventh terminal located next to the other fifth terminal is exposed at a position next to the first exposed portion of the other fifth terminal, so that the first exposed portion of the seventh terminal can absorb electromagnetic waves from the first exposed portion of the other fifth terminal.

A method of manufacturing a connector in an aspect of the invention includes placing into a first or second mold a plurality of terminals in spaced relation to each other in a first direction, the terminals including a pair of first terminals, a second terminal, a third terminal, and a fourth terminal; closing the first and second molds so that the terminals are housed at least partially in a cavity of the first and second molds; injecting plastic material into the cavity so that the terminals are at least partially inserted in the plastic material; hardening the plastic material in the cavity; and taking out the plastic material and the terminals from the first and second molds. The placing of the terminals includes placing the pair of first terminals adjacent to each other, placing the second terminal next to one of the first terminals on one side in the first direction, placing the third terminal next to the other first terminal on the other side in the first direction, and placing the fourth terminal on the one side in the first direction relative to the second terminal. The closing of the first and second molds includes abutting a first protrusion of the first mold on an area on the other side in the first direction of a first part in a second direction of the second terminal, entire areas in the first direction of first parts in the second direction of the first terminals, and an area on the one side in the first direction of a first part in the second direction of the third terminal, and abutting a second protrusion of the first mold on an entire or partial area of a first part in the second direction of the fourth terminal, the second direction crossing the first direction. The injecting of the plastic material includes making the plastic material flow through a gap between the first protrusion and the second protrusion.

The manufacturing method in this aspect of the invention has at least the following technical features. First, it is possible to smooth the flow of the plastic material injected into the cavity of the first and second molds for the following reasons. Part of the injected plastic material flows through the gap between the first and second protrusions of the first mold. The gap serves as a flow path for the plastic material, making it possible to improve the fluidity of the plastic material injected into the molds. Moreover, the first protrusion of the first mold abuts on the area on the other side in the first direction of the first part of the second terminal, but it does not abut on the area on the one side in the first direction of the first part of the second terminal. Accordingly, the first protrusion of the first mold can be downsized in length, which means that the gap between the first and second protrusions of the first mold widens, as compared to the configuration that the first protrusion of the first mold abuts on the entire area of the first part of the second terminal. This facilitates the flow of the plastic material through the gap. Second, it is possible to equalize electromagnetic waves from the one of the first terminals and electromagnetic waves from the other first terminal. This can be achieved with the following configuration. The first protrusion of the first mold makes a recess in the plastic material, which exposes the area of the first part in the second direction of the second terminal, the entire area of the first part in the second direction of the first terminals, and the area of the first part in the second direction of the third terminal. The area of the second terminal located next to the one first terminal is exposed at a position next to the first part of the one of the first terminals, so that the area of the second terminal can absorb electromagnetic waves from the first part of the one of the first terminals. The area of the third terminal located next to the other first terminal is exposed at a position next to the first part of the other first terminal, the area of the third terminal can absorb electromagnetic waves from the first part of the other first terminal.

The second protrusion may be located on one side in the second direction relative to the first protrusion. The manufacturing method in this aspect makes it possible to facilitate the flow of the plastic material through the gap and therefore further smooth the flow of the plastic material injected in the cavity of the molds.

The closing of the first and second molds may further include abutting the second protrusion on at least an area on the one side in the first direction of a second part on the one side in the second direction of the second terminal relative to the first part of the second terminal.

The manufacturing method in this aspect of the invention can reduce the possibility that the second terminal may be displaced by the flow of plastic material injected into the cavity of the first and second molds and smooth the flow of the plastic material. More particularly, the first protrusion of the first mold abuts on the area on the other side in the first direction of the first part of the second terminal, and the second protrusion abuts on the area on the one side in the first direction of the second part of the second terminal. In other words, the first and second protrusions abut on different portions in the second direction of the second terminal, reducing the possibility that the plastic material may cause displacement of the second terminal. Moreover, the second protrusion is located on the one side in the second direction relative to the first protrusion. This configuration facilitates the flow of the plastic material through the gap between the first and second protrusions.

The closing of the first and second molds may further include abutting a first protrusion of the second mold, from an opposite side to the first protrusion of the first mold, on an area on the other side in the first direction of the first part of the second terminal, entire areas in the first direction of the first parts of the first terminals, and an area on the one side in the first direction of the first part of the third terminal.

The manufacturing method in this aspect of the invention can reduce the possibility that the first, second, and third terminals may be displaced by the flow of plastic material injected into the cavity of the first and second molds. The is because the first protrusion of the first mold abuts the first, second, and third terminals from a side, and the first protrusion of the second mold abuts on the first, second, and third terminals from the opposite side.

The closing of the first and second molds may further include abutting a second protrusion of the second mold, from an opposite side to the second protrusion of the first mold, on an entire or partial area of the first part of the fourth terminal. The injecting of the plastic material may further include flowing the plastic material through a gap between the first protrusion and the second protrusion of the second mold.

The manufacturing method in this aspect of the invention can reduce the possibility that the fourth terminal may be displaced by the flow of plastic material injected into the cavity of the first and second molds. This is because the first protrusion of the first mold abuts on the fourth terminal from a side, and the first protrusion of the second mold abuts on the fourth terminal from the opposite side.

The fourth terminal may include a plurality of the fourth terminals including at least one of the fourth terminals and a remaining fourth terminal. The placing of the terminals may include placing in the first or second mold the at least one of the fourth terminals on the one side in the first direction relative to the second terminal and placing the remaining fourth terminal. The abutting of the second protrusion of the first mold may be abutting the second protrusion of the first mold on an entire or partial area of a first part in the second direction of the at least one of the fourth terminals. The closing of the first and second molds may further include abutting a third protrusion of the first mold on an entire or partial area of a first part in the second direction of the remaining fourth terminal. The injecting of the plastic material may further include flowing the plastic material through a gap between the first protrusion and the third protrusion of the first mold.

The manufacturing method in this aspect of the invention can reduce the possibility that the fourth terminals may be displaced by the flow of plastic material injected into the cavity of the first and second molds and smooth the flow of the plastic material. More particularly, the second protrusion of the first mold abuts on the at least one of the fourth terminals, and the third protrusion of the first mold abuts on the remaining fourth terminal. Moreover, the plastic material flows through the gap between the first protrusion and the second protrusion of the first mold and through the gap between the first protrusion and the third protrusion of the first mold, making it possible to improve the fluidity of the plastic material.

The third protrusion of the first mold may be located one side in the second direction relative to the first protrusion of the first mold. In the manufacturing method in this aspect of the invention, the plastic material can readily flow in the gap between the first and third protrusions, further improving fluidity of the plastic material injected into the cavity of the molds.

The closing of the first and second molds may further include abutting a third protrusion of the second mold, from an opposite side to the third protrusion of the first mold, on an entire or partial area of the first part of the remaining fourth terminal. The injecting of the plastic material may further include flowing the plastic material through a gap between the first protrusion and the third protrusion of the second mold.

The manufacturing method in this aspect of the invention can reduce the possibility that the remaining fourth terminal may be displaced by the flow of plastic material injected into the cavity of the first and second molds. This is because the third protrusion of the first mold abuts on the remaining fourth terminal from a side, and the first protrusion of the second mold abuts on the remaining fourth terminal from the opposite side.

The terminals may further include a pair of fifth terminals, a sixth terminal, and a seventh terminal. The placing of the terminals may further include placing the fifth terminals adjacent to each other, placing the third terminal between one of the fifth terminals on the one side in the first direction and the other first terminal, and placing the seventh terminal next to the other fifth terminal on the other side in the first direction. The abutting of the first protrusion of the first mold may include abutting the first protrusion of the first mold on the area on the other side in the first direction of the first part of the second terminal, the entire areas in the first direction of the first parts of the first terminals, an entire area in the first direction of the first part of the third terminal, entire areas in the first direction of first parts in the second direction of the fifth terminals, and an area on the one side in the first direction of a first part in the second direction of the seventh terminal.

The abutting of the first protrusion of the second mold may include abutting the first protrusion of the second mold, from an opposite side to the first protrusion of the first mold, on the area on the other side in the first direction of the first part of the second terminal, the entire areas in the first direction of the first parts of the first terminals, an entire area of the first direction of the first part of the third terminal, entire areas in the first direction of the first parts of the fifth terminals, and an area on the one side in the first direction of the first part of the seventh terminal.

The manufacturing method in this aspect of the invention makes it possible to smooth the flow of the plastic material injected in the cavity of the first and second molds. This is because the first protrusion of the first mold abuts on the area on the one side in the first direction of the first part of the seventh terminal, but it does not abut on the area on the other side in the first direction of the first part of the seventh terminal. Thus, first protrusion in the first direction can be downsized in the first direction, as compared to the configuration that the first protrusion of the first mold abuts on the entire area of the first portion of the seventh terminal.

The sixth terminal may be omitted. In this case, the placing of the terminals includes placing the third terminal between one of the fifth terminals on the one side in the first direction and the other first terminal.

BRIEF DESCRIPTION OF DRAWINGS

FIG. 5A is a schematic end view corresponding to FIG. 2A, illustrating steps of manufacturing the connector.

DESCRIPTION OF EMBODIMENTS

Figure 1A:
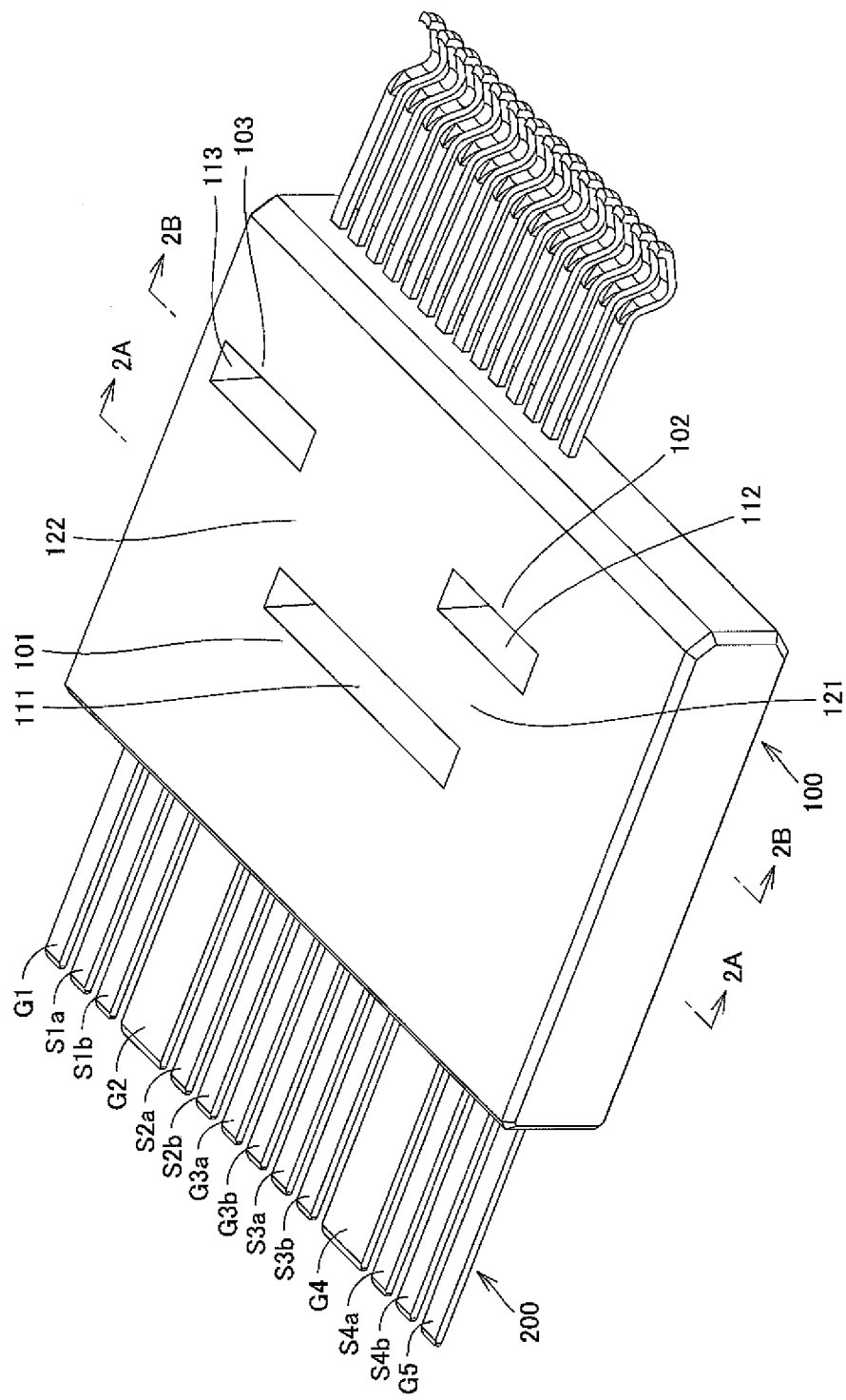
FIG. 1A is a front, top, right side perspective view of a body and a terminal group of a connector in accordance with an embodiment of the invention.

A connector C in accordance with an embodiment of the invention will be described below with reference to FIG. 1A to FIG. 4D. The connector C includes a case (not shown), a body 100, and a terminal group 200. X-X' direction in FIG. 2A to FIG. 4B correspond to an array direction of a plurality of terminals of the terminal group of the connector C and to the first direction in the claims. In the X-X' direction, the X direction corresponds to one side in the first direction, and the X' direction corresponds to the other side in the first direction. Y-Y' direction in FIG. 3A to FIG. 4B corresponds to a lengthwise direction of the terminals of the terminal group of the connector C and to the second direction in the claims. The Y-Y' direction and the X-X' direction cross each other at right angles. In the Y-Y' direction, the Y direction corresponds to one side in the second direction, and the Y' direction corresponds to the other side in the second direction. Z-Z' direction in FIG. 2A and FIG. 2B corresponds to the thickness direction of the terminals of the terminal group of the connector C. Z-Z' direction crosses the Y-Y' direction and the X-X' direction at right angles.

The body 100 is made of insulating plastic material. The body 100 holds the terminals of the terminal group 200 partially at the same height (first height position) in the order of G1, S1a, S1b, G2, S2a, S2b, G3a, G3b, S3a, S3b, G4, S4a, S4b, and G5 at intervals in the X-X' direction. More particularly, the terminals of the terminal group 200 are insert-molded and held in the body 100 at the first height position in the above-described order at intervals in the X-X' direction. The body 100 and the terminal group 200 are housed in the case. A space in the case on the Y-direction side relative to the body 100 serves as a connection hole for connection with a mating connector.

The body 100 includes a first part 101, a second part 102, and a third part 103. The first part 101 is the central part of the body 100. The second part 102 is a part of the body 100 on an oblique direction side including X- and Y-direction components relative to the first part 101. The third part 103 is a part of the body 100 on an oblique direction side including the X'- and the Y-direction components relative to the first part 101.

The body 100 further includes a pair of first recesses 111, a pair of second recesses 112, a pair of third recesses 113, a pair of first separating portions 121, and a pair of second separating portions 122.

Figure 2A:
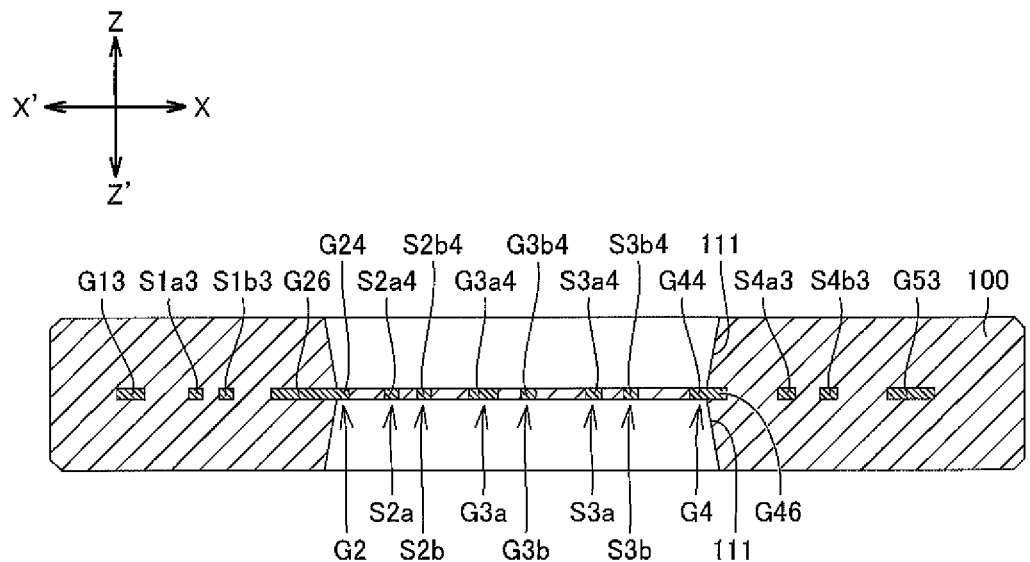
FIG. 2A is a sectional view of the body and the terminal group taken along 2A-2A in FIG. 1A.
Figure 2B:
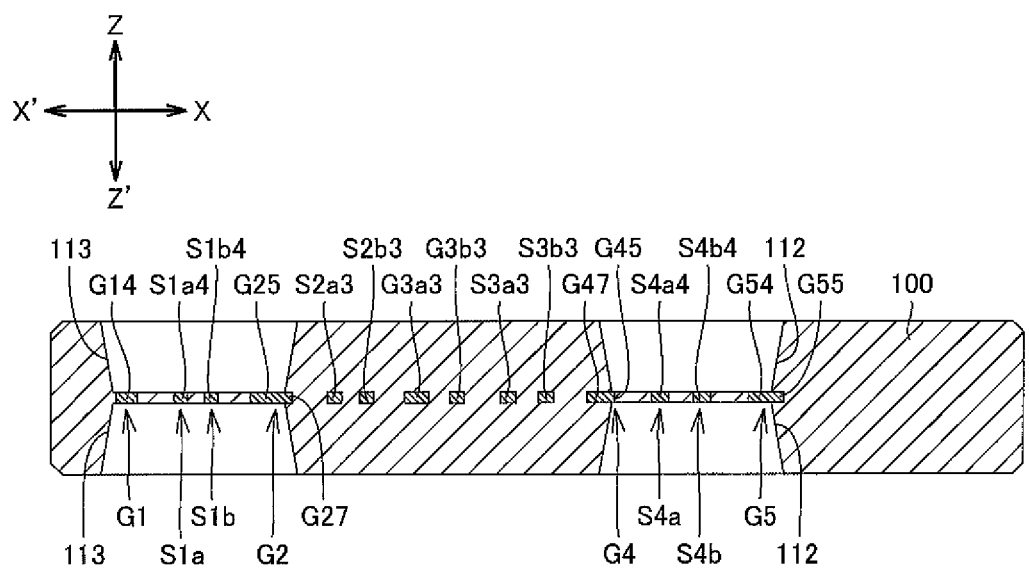
FIG. 2B is a sectional view of the body and the terminal group taken along 2B-2B in FIG. 1A.

As best illustrated in FIG. 2A and FIG. 2B, one of the first recesses 111 is made in the first part 101 of the body 100, on the Z-direction side relative to the terminals G2, S2a, S2b, G3a, G3b, S3a, S3b, and G4. This first recess 111 is a rectangular recess that extends in the X-X' direction and is open in the Z direction. The other first recess 111 is made in the first part 101 of the body 100, on the Z'-direction side relative to the terminals G2, S2a, S2b, G3a, G3b, S3a, S3b, and G4. The other first recess 111 is a rectangular recess that extends in the X-X' direction and is open in the Z' direction.

One of the second recesses 112 is made in the second part 102 of the body 100, on the Z-direction side relative to the terminals G4, S4a, S4b, and G5. This second recess 112 is a rectangular recess that extends in the X-X' direction and is open in the Z direction. The other second recess 112 is made in the second part 102 of the body 100, on the Z'-direction side relative to the terminals G4, S4a, S4b, and G5. The other second recess 112 is a rectangular recess that extends in the X-X' direction and is open in the Z' direction.

One of the third recesses 113 is made in the third part 103 of the body 100, on the Z-direction side relative to the terminals G1, S1a, S1b, and G2. This third recess 113 is a rectangular recess that extends in the X-X' direction and is open in the Z direction. The third recess 113 is located on the X' direction side relative to and in spaced relation to the one of the second recesses 112. The other third recess 113 is made in the third part 103 of the body 100, on the Z'-direction side relative to the terminals G1, S1a, S1b, and G2. The other third recess 113 is a rectangular recess that extends in the X-X' direction and is open in the Z' direction. The other third recess 113 is located on the X' direction side of and in spaced relation to the other second recess 112.

Figure 1B:
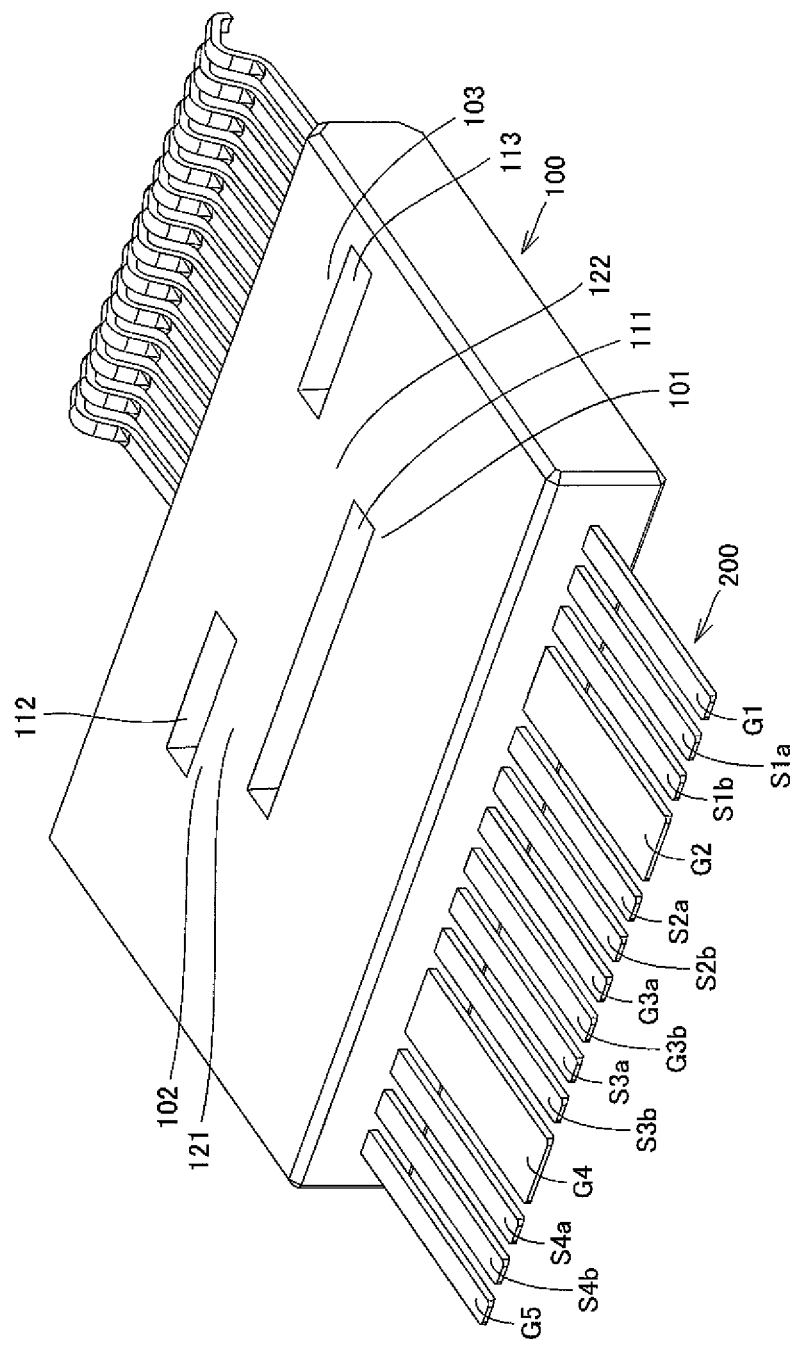
FIG. 1B is a back, bottom, left perspective view of the body and the terminal group.

As best illustrated in FIG. 1A, one of the first separating portions 121 is plastic material (a part of the plastic material forming the body 100) that is located between and separates the one of the first recesses 111 and the one of the second recesses 112 of the body 100. As best illustrated in FIG. 1B, the other first separating portion 121 is located between and separates the other first recess 111 and the other second recess 112 of the body 100.

As best illustrated in FIG. 1A, one of the second separating portions 122 is plastic material (a part of the plastic material forming the body 100) that is located between and separates the one of the first recesses 111 and the one of the third recesses 113 of the body 100. As best illustrated in FIG. 1B, the other second separating portion 122 is located between and separates the other first recess 111 and the other third recess 113 of the body.

The terminal group 200 include the terminals S1a, S1b, S2a, S2b, S3a, S3b, S4a, S4b, G1, G2, G3a, G3b, G4, and G5 as described above.

As illustrated in FIG. 1A to FIG. 4B, the terminals S3a and S3b are differential signal terminals extending in the Y-Y' direction and adjacent to each other. The terminal S3a and the terminal S3b are respectively located on the X'-direction side and the X-direction side relative to the other of the pair. The terminals S3b and S3a respectively correspond to one of the first terminals and the other first terminal in the claims.

The terminal S3a includes a contact portion S3a1, a connecting portion S3a2, a middle portion S3a3, and a first exposed portion S3a4. The contact portion S3a1 extends in the Y-Y' direction. The contact portion S3a1 protrudes from the body 100 in the Y direction so as to be disposed in the connection hole. The tip of the contact portion S3a1 curves in the Z' direction.

The connecting portion S3a2 extends in the Y-Y' direction. The connecting portion S3a2 is located on an oblique direction side including the X- and Y'-direction components relative to the contact portion S3a1. The connecting portion S3a2 is located at the same height as the contact portion S3a1. The connecting portion S3a2 includes a front portion and a rear portion. The front portion of the connecting portion S3a2, i.e. the Y-direction side portion of the connecting portion S3a2, is held in the body 100. The front portion of the connecting portion S3a2 is covered with the body 100 with no clearance therebetween. The rear portion of the connecting portion S3a2, i.e. the Y'-direction side portion of the connecting portion S3a2 and contiguous with the front portion, protrudes from the body 100 in the Y' direction.

The middle portion S3a3 is provided between the contact portion S3a1 and the front portion of the connecting portion S3a2, connects the contact portion S3a1 to the connecting portion S3a2, and is held in the body 100. The middle portion S3a3 is covered with the body 100 with no clearance therebetween. The middle portion S3a3 extends (is inclined) from the contact portion S3a1 to the connecting portion S3a2 in an oblique direction including the X- and Y'-direction components.

Figure 3A:
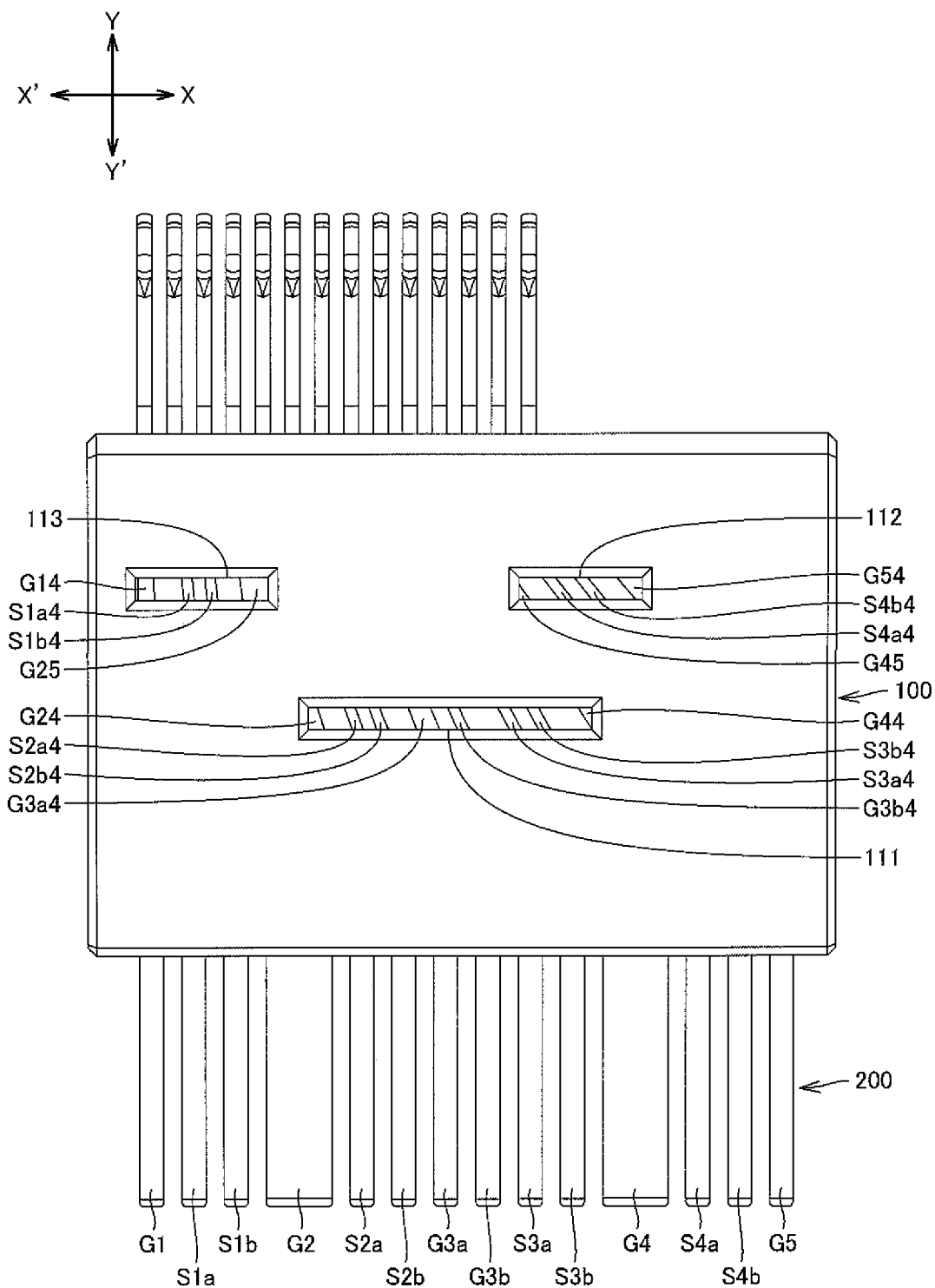
FIG. 3A is a plan view of the body and the terminal group.
Figure 3B:
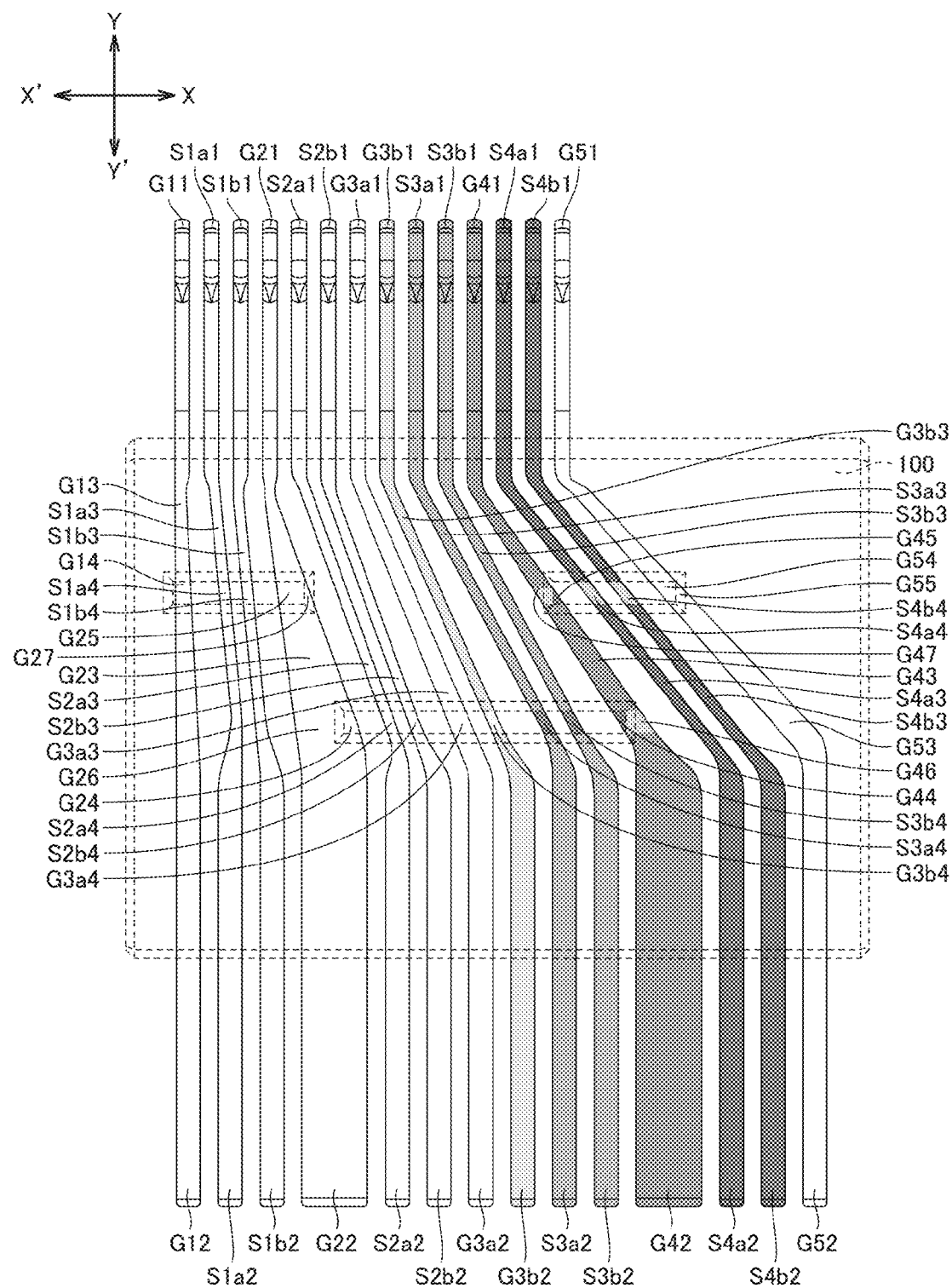
FIG. 3B is a plan view of the body and the terminal group, with the body illustrated with broken lines.
Figure 4A:
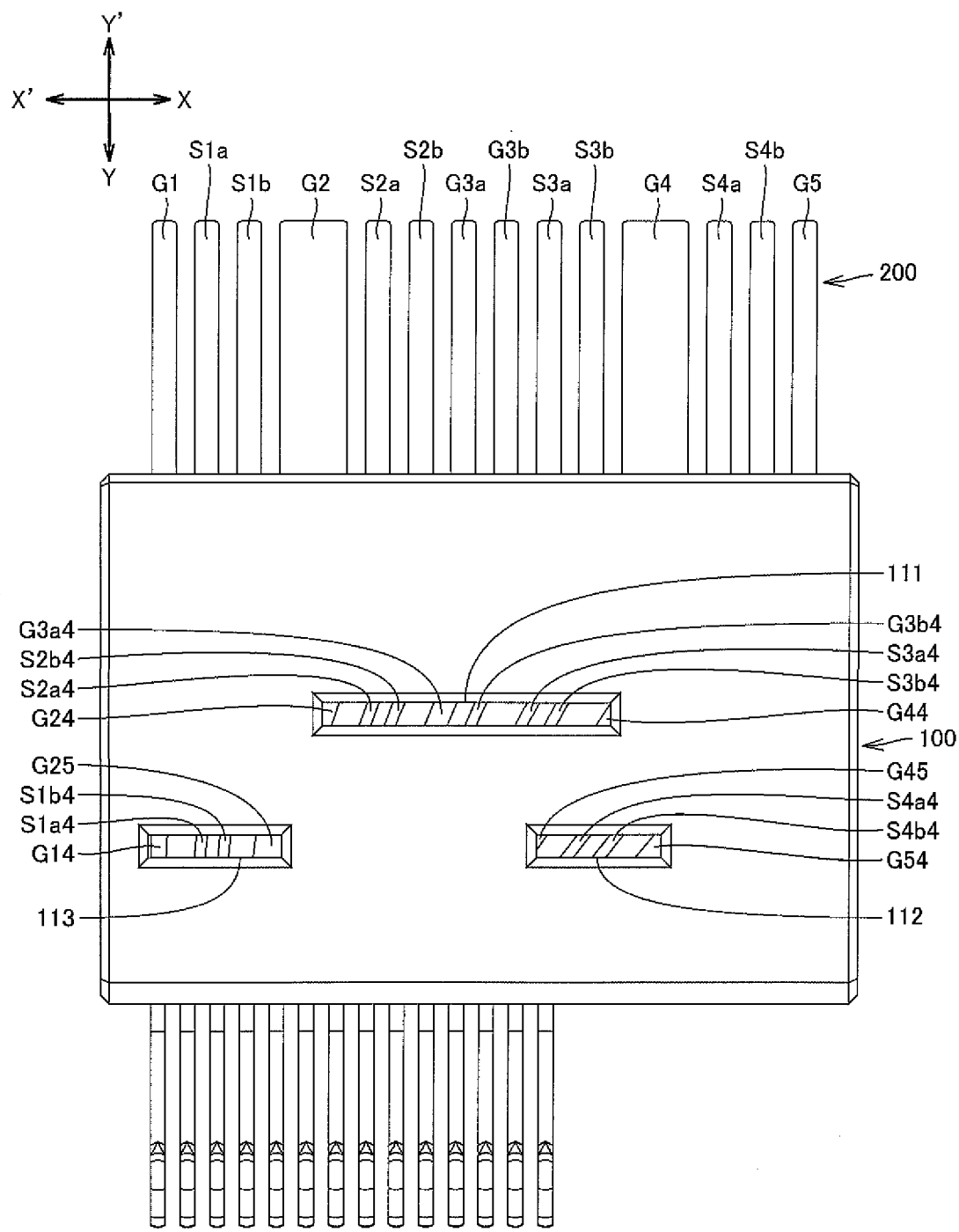
FIG. 4A is a bottom view of the body and the terminal group.
Figure 4B:
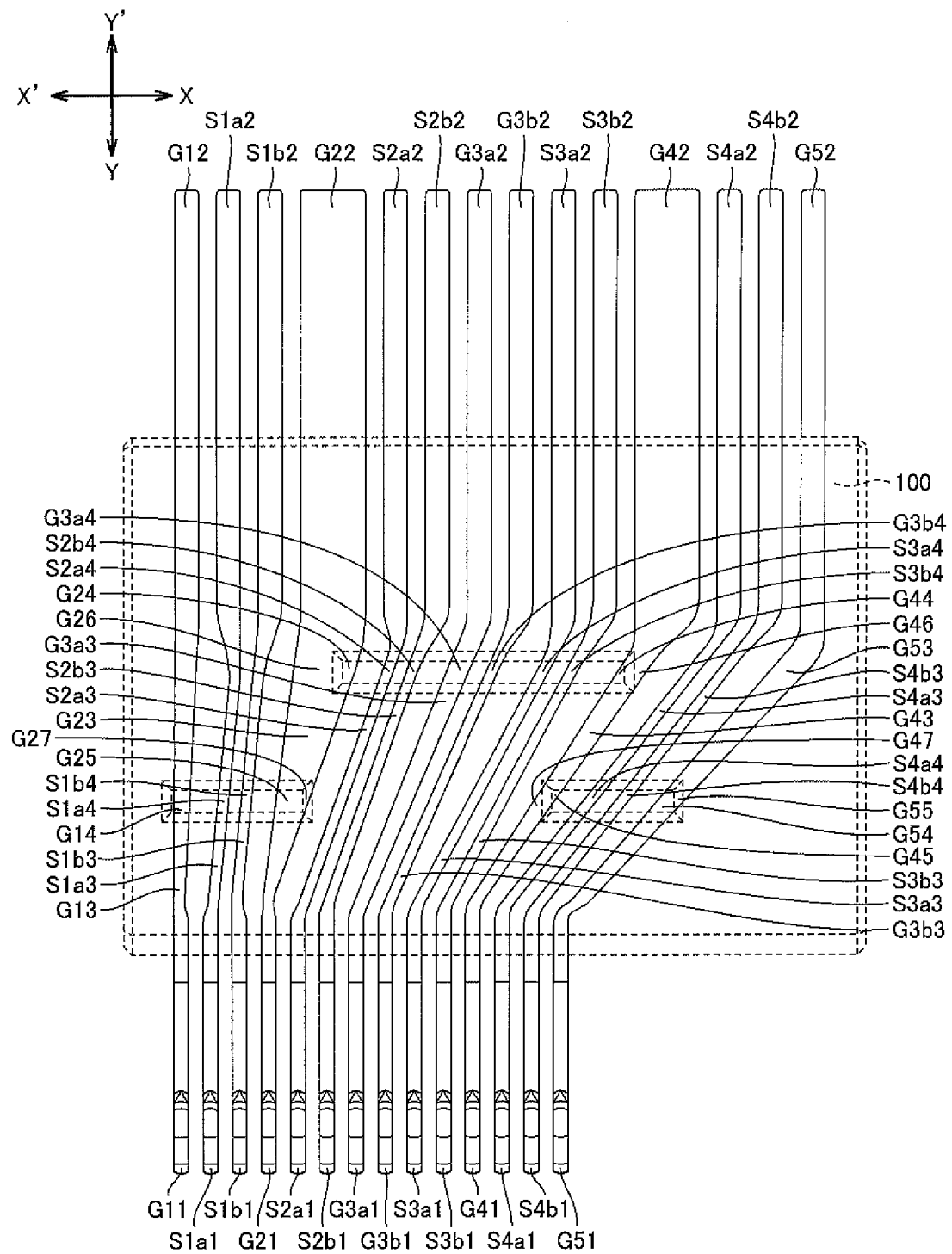
FIG. 4B is a bottom view of the body and the terminal group, with the body illustrated with broken lines.

As illustrated in FIG. 3B and FIG. 4B, the first exposed portion S3a4 is a part in the Y-Y' direction (first part) of the terminal S3a and includes the entire area in the X-X' direction of the first part. As best illustrated in FIG. 2A, the first exposed portion S3a4 is exposed to the outside of the body 100 through the one and other first recesses 111 of the body 100.

The terminal S3b includes a contact portion S3b1, a connecting portion S3b2, a middle portion S3b3, and a first exposed portion S3b4. The contact portion S3b1 is similar in configuration to the contact portion S3a1. The contact portion S3b1 is located on the X-direction side relative to and in spaced relation to the contact portion S3a1 and extends inside the connection hole.

The connecting portion S3b2 is similar in configuration to the connecting portion S3a2. The connecting portion S3b2 is located on the X-direction side relative to and in spaced relation to the connecting portion S3a2. Accordingly, the connecting portion S3b2 is located on an oblique direction side including the X- and Y'-direction components relative to the contact portion S3b1. The connecting portion S3b2 is located at the same height as the contact portion S3b1.

The middle portion S3b3 is provided between the contact portion S3b1 and the front portion of the connecting portion S3b2, connects the contact portion S3b1 to the connecting portion S3b2, and is held in the body 100. The middle portion S3b3 is covered with the body 100 with no clearance therebetween. The middle portion S3b3 extends (is inclined) in an oblique direction including X- and Y'-direction components from the contact portion S3b1 to the connecting portion S3b2. The middle portion S3b3 is located on the X-direction side relative to and in spaced relation to the middle portion S3a3. The inclination angle of the middle portion S3*b*3 relative to the contact portion S3*b*1 is the same as that of the middle portion S3*a*3 relative to the contact portion S3*a*1.

As illustrated in FIG. 3B and FIG. 4B, the first exposed portion S3*b*4 is a part (first part) in the Y-Y' direction of the terminal S3*b* and includes the entire area in the X-X' direction of the first part. The first exposed portion S3*b*4 is located on the X-direction side relative to and in spaced relation to the first exposed portion S3*a*4 of the terminal S3*a*. As best illustrated in FIG. 2A, the first exposed portion S3*b*4 is exposed to the outside of the body 100 the one and other first recesses 111 of the body 100.

As illustrated in FIG. 1A to FIG. 4B, the terminal G4 extends in the Y-Y' direction to be located between the terminal S3*b* and the terminal S4*a*. The terminal G4 may be a ground terminal, or it may be a low-speed signal terminal adapted to transmit signals at a lower speed than the terminals S3*a*, S3*b*, S4*a*, and S4*b* do. For example, the low-speed signal terminal may be a single-ended signal terminal, a power terminal, or a terminal of other functions adapted to transmit signals of frequency of at most 1/10 or at most 1/100 of the frequency of signals transmitted by the terminals S3*a*, S3*b*, S4*a*, and S4*b*. The terminal G4 corresponds to the second terminal in the claims.

The terminal G4 includes a contact portion G41, a connecting portion G42, a middle portion G43, a first exposed portion G44, a second exposed portion G45, a first unexposed portion G46, and a second unexposed portion G47. The contact portion G41 extends in the Y-Y' direction, protrudes in the Y direction from the body 100, and is disposed in the connection hole. The contact portion G41 is located on the X-direction side relative to and in spaced relation to the contact portion S3*b*1 of the terminal S3*b*. The tip of the contact portion G41 curves in the Z' direction.

The connecting portion G42 extends in the Y-Y' direction. The connecting portion G42 is located on the X-direction side relative to and in spaced relation to the connecting portion S3*b*2 of the terminal S3*b*. The connecting portion G42 is disposed on an oblique direction side including X- and Y'-direction components relative to the contact portion G41. The connecting portion G42 is located at the same height as the contact portion G41. The connecting portion G42 includes a front portion and a rear portion. The front portion of the connecting portion G42, i.e. the Y-direction side portion of the connecting portion G42, and is held in the body 100. The front portion of the connecting portion G42 is covered with the body 100 with no clearance therebetween. The rear portion of the connecting portion, i.e. the Y'-direction side portion of the connecting portion G42, is contiguous with the front portion and protrudes from the body 100 in the Y' direction.

The middle portion G43 is provided between the contact portion G41 and the front portion of the connecting portion G42, connects the contact portion G41 to the connecting portion G42, and is held in the body 100. The middle portion G43 is covered with the body 100 with no clearance therebetween. The middle portion G43 extends (is inclined) in an oblique direction including X- and Y'-direction components from the contact portion G41 to the connecting portion G42. The middle portion G43 is located on the X-direction side relative to and in spaced relation to the middle portion S3*b*3 of the terminal S3*b*.

As illustrated in FIG. 3B and FIG. 4B, the first exposed portion G44 includes an area on the X'-direction side of a part in the Y-Y' direction (first part) of the terminal G4. The first exposed portion G44 is located on the X-direction side relative to and in spaced relation to the first exposed portion S3*b*4 of the terminal S3*b*. As best illustrated in FIG. 2A, the first exposed portion G44 is exposed to the outside of the body 100 through the one and other first recesses 111 of the body 100.

As illustrated in FIG. 3B and FIG. 4B, the first unexposed portion G46 includes an area on the X-direction side of the first part of the terminal G4. In other words, in the first part of the terminal G4, the first unexposed portion G46 is on the X-direction side relative to the first exposed portion G44. As best illustrated in FIG. 2A, the first unexposed portion G46 is held in the body 100, i.e. covered with the body 100 with no clearance therebetween.

As illustrated in FIG. 3B and FIG. 4B, the second exposed portion G45 includes an area on the X-direction side of a part (second part) on the Y-direction side relative to the first part of the terminal G4. As best illustrated in FIG. 2B, the second exposed portion G45 is exposed to the outside of the body 100 through the one and the other of the second recesses 112.

As illustrated in FIG. 3B and FIG. 4B, the second unexposed portion G47 includes an area on the X'-direction side of the second part of the terminal G4. In other words, in the second part of the terminal G4, the second unexposed portion G47 is on the X'-direction side relative to the second exposed portion G45. As best illustrated in FIG. 2B, the second unexposed portion G47 is held in the body 100 and covered with the body 100 with no clearance therebetween.

The terminals S4*a* and S4*b* are differential signal terminals extending in the Y-Y' direction adjacent to each other, and on the X-direction side relative to the terminals S3*a* and S3*b*. The terminal S4*a* is located on the X'-direction side, and the terminal S4*b* is located on the X-direction side. The terminals S4*a* and S4*b* correspond to the at least one of the fourth terminals in the claims.

The terminal S4*a* includes a contact portion S4*a*1, a connecting portion S4*a*2, a middle portion S4*a*3, and a first exposed portion S4*a*4. The contact portion S4*a*1, similar in configuration to the contact portion S3*a*1, is located on the X-direction side relative to and in spaced relation to the contact portion G41 of the terminal G4. The connecting portion S4*a*2, similar in configuration to the connecting portion S3*a*2, is located on the X-direction side relative to and in spaced relation to the connecting portion G42 of the terminal G4. Accordingly, the connecting portion S4*a*2 is located on a side in a direction including an X- and Y'-direction components (obliquely rearward) relative to the contact portion S4*a*1. The connecting portion S4*a*2 is located at the same height as the contact portion S4*a*1.

The middle portion S4*a*3 is provided between the contact portion S4*a*1 and the front portion of the connecting portion S4*a*2, connects the contact portion S4*a*1 to the connecting portion S4*a*2, and is held in the body 100. The middle portion S4*a*3 is covered with the body 100 with no clearance therebetween. The middle portion S4*a*3 extends (is inclined) in an oblique direction including X- and Y'-direction components from the contact portion S4*a*1 to the connecting portion S4*a*2. The middle portion S4*a*3 is located on the X-direction side relative to and in spaced relation to the middle portion G43 of the terminal G4. The middle portion S4*a*3 is more inclined to the X-direction side than the middle portions S3*a*3 and S3*b*3. In other words, the inclination angle of the middle portion S4*a*3 relative to the contact portion S4*a*1 is larger than that of the middle portions S3*a*3 and S3*b*3 relative to the contact portions S3*a*1 and S3*b*1, respectively.

As illustrated in FIG. 3B and FIG. 4B, the first exposed portion S4*a*4 is a part in the Y-Y' direction (first part) of the terminal S4*a* and includes the entire area in the X-X' direction of the first part. The first exposed portion S4*a*4 is located on the X-direction side relative to and in spaced relation to the second exposed portion G45. As best illustrated in FIG. 2B, the first exposed portion S4*a*4 is exposed to the outside of the body 100 through the one and other second recesses 112 of the body 100.

The terminal S4*b* includes a contact portion S4*b*1, a connecting portion S4*b*2, a middle portion S4*b*3, and a first exposed portion S4*b*4. The contact portion S4*b*1, similar in configuration to the contact portion S3*b*1, located on the X-direction side relative to and in spaced relation to the contact portion S4*a*1 of the terminal S4*a*. The connecting portion S4*b*2 is similar in configuration to the connecting portion S3*b*2. The connecting portion S4*b*2 is located on the X-direction side relative to and in spaced relation to the connecting portion S4*a*2. Accordingly, the connecting portion S4*b*2 is located on an oblique direction side including X- and Y'-direction components relative to the contact portion S4*b*1. The connecting portion S4*b*2 is located at the same height as the contact portion S4*b*1.

The middle portion S4*b*3 is provided between the contact portion S4*b*1 and the front portion of the connecting portion S4*b*2, connects the contact portion S4*b*1 to the connecting portion S4*b*2, and is held in the body 100. The middle portion S4*b*3 is covered with the body 100 with no clearance therebetween. The middle portion S4*b*3 extends (is inclined) in an oblique direction including X- and Y'-direction components from the contact portion S4*b*1 to the connecting portion S4*b*2. The middle portion S4*b*3 is located on the X-direction side relative to and in spaced relation to the middle portion S4*a*3. The inclination angle of the middle portion S4*b*3 relative to the contact portion S4*b*1 is the same as that of the middle portion S4*a*3 relative to the contact portion S4*a*1.

As illustrated in FIG. 3B and FIG. 4B, the first exposed portion S4*b*4 is a part in the Y-Y' direction (first part) of the terminal S4*b* and includes the entire area in the X-X' direction of the first part. The first exposed portion S4*b*4 is located on the X-direction side relative to and in spaced relation to the first exposed portion S4*a*4. As best illustrated in FIG. 2B, the first exposed portion S4*b*4 is exposed to the outside of the body 100 through the one and other second recesses 112 of the body 100.

The terminal G5 extends in the Y-Y' direction to be located on the X-direction side relative to the terminal S4*b*. The terminal G5 may be a ground terminal, or it may be a low-speed signal adapted to transmit signals at a lower speed than the terminals S4*a* and S4*b* do. For example, the low-speed signal terminal may be a single-ended signal terminal, a power terminal, or a terminal of other functions adapted to transmit signals of frequency of at most ⅒ or at most 1/100 of the frequency of signals transmitted by the terminals S4*a* and S4*b*. The terminal G5 corresponds to the at least one of the fourth terminals in the claims.

The terminal G5 includes a contact portion GM, a connecting portion G52, a middle portion G53, a first exposed portion G54, and a first unexposed portion G55. The contact portion GM, similar in configuration to the contact portion G3*b*1 (to be described), is located on the X-direction side relative to and in spaced relation to the contact portion S4*b*1 of the terminal S4*b*. The connecting portion G52, similar in configuration to the connecting portion G3*b*2 (to be described), is located on the X-direction side relative to and in spaced relation to the connecting portion S4*b*2 of the terminal S4*b*. Accordingly, the connecting portion G52 is located on an oblique direction side including X- and Y'-direction components relative to the contact portion G51. The connecting portion G52 is located at the same height as the contact portion G51.

The middle portion G53 is provided between the contact portion G51 and the front portion of the connecting portion G52, connects the contact portion GM to the connecting portion G52, and is held in the body 100. The middle portion G53 is covered with the body 100 with no clearance therebetween. The middle portion G53 extends (is inclined) in an oblique direction including X- and Y'-direction components from the contact portion G51 to the connecting portion G52. The middle portion G53 is located on the X-direction side relative to and in spaced relation to the middle portion S4*b*3 of the terminal S4*b*.

As illustrated in FIG. 3B and FIG. 4B, the first exposed portion G54 includes an area on the X'-direction side of a part in the Y-Y' direction (first part) of the terminal G5. The first exposed portion G54 is located on the X-direction side relative to and in spaced relation to the first exposed portion S4*b*4 of the terminal S4*b*. As best illustrated in FIG. 2B, the first exposed portion G54 is exposed to the outside of the body 100 through the one and other second recesses 112 of the body 100.

As illustrated in FIG. 3B and FIG. 4B, the first unexposed portion G55 includes an area on the X-direction side of the first part of the terminal G5. In other words, in the first part of the terminal G5, the first unexposed portion G55 is on the X-direction side relative to the first exposed portion G54. As best illustrated in FIG. 2B, the first unexposed portion G55 is held in the body 100, i.e. covered with the body 100 with no clearance therebetween.

As illustrated in FIG. 1A to FIG. 4B, the terminals G3*a* and G3*b* extend in the Y-Y' direction to be located between the terminal S3*a* and the terminal S2*b*. The terminals G3*a* and G3*b* may be ground terminals, or they may be low-speed signal terminals adapted to transmit signals at a lower speed than terminals S3*a*, S3*b*, S2*a*, and S2*b*. For example, the low-speed signal terminals may be single-ended signal terminals, power terminals, or terminals of other functions adapted to transmit signals of frequency of at most ⅒ or at most 1/100 of the frequency of signals transmitted by the terminals S3*a*, S3*b*, S2*a*, and S2*b*. The terminal G3*a* corresponds to the sixth terminal and the terminal G3*b* corresponds to the third terminal in the claims.

The terminal G3*b* includes a contact portion G3*b*1, a connecting portion G3*b*2, a middle portion G3*b*3, and a first exposed portion G3*b*4. The contact portion G3*b*1 is similar in configuration to the contact portion G41 of the terminal G4. The contact portion G3*b*1 is disposed on the X'-direction side relative to and in spaced relation to the contact portion S3*a*1 of the terminal S3*a*.

The connecting portion G3*b*2 extends in the Y-Y' direction. The connecting portion G3*b*2 is located on the X'-direction side relative to and in spaced relation to the connecting portion S3*a*2 of the terminal S3*a*. The connecting portion G3*b*2 is located on an oblique direction side including X- and Y'-direction components relative to the contact portion G3*b*1. The connecting portion G3*b*2 is located at the same height as the contact portion G3*b*1. The connecting portion G3*b*2 includes a front portion and a rear portion. The front portion of the connecting portion G3*b*2, i.e. the Y-direction side portion of the connecting portion G3*b*2, is held in the body 100. The front portion of the connecting portion G3*b*2 is covered with the body 100 with no clearance therebetween. The rear portion of the connecting portion G3*b*2, i.e. the Y'-direction side portion of the connecting portion S3a2, is contiguous with the front portion and protrudes from the body 100 in the Y' direction.

The middle portion G3b3 is provided between the contact portion G3b1 and the front portion of the connecting portion G3b2, connects the contact portion G3b1 to the connecting portion G3b2, and is held in the body 100. The middle portion G3b3 is covered with the body 100 with no clearance therebetween. The middle portion G3b3 extends (is inclined) in an oblique direction including X- and Y'-direction components from the contact portion G3b1 to the connecting portion G3b2. The middle portion G3b3 is disposed on the X'-direction side relative to and in spaced relation to the middle portion S3a3 of the terminal S3a.

As illustrated in FIG. 3B and FIG. 4B, the first exposed portion G3b4 is a part in the Y-Y' direction (first part) of the terminal G3b and includes the entire area in the X-X' direction of the first part. The first exposed portion G3b4 is disposed on the X'-direction side relative to and in spaced relation to the first exposed portion S3a4 of the terminal S3a. As best illustrated in FIG. 2A, the first exposed portion G3b4 is exposed to the outside of the body 100 through the one and other first recesses 111 of the body 100.

The terminal G3a includes a contact portion G3a1, a connecting portion G3a2, a middle portion G3a3, and a first exposed portion G3a4. The contact portion G3a1, similar in configuration to the contact portion G41 of the terminal G4, is disposed on the X'-direction side relative to and in spaced relation to the contact portion G3b1 of the terminal G3b.

The connecting portion G3a2, similar in configuration to the connecting portion G3b2 of the terminal G3b, is disposed on the X'-direction side relative to and in spaced relation to the connecting portion G3b2. The connecting portion G3a2 is located on an oblique direction side including X- and Y'-direction components relative to the contact portion G3a1. The connecting portion G3a2 is located at the same height as the contact portion G3a1.

The middle portion G3a3 is provided between the contact portion G3a1 and the front portion of the connecting portion G3a2, connects the contact portion G3a1 to the connecting portion G3a2, and is held in the body 100. The middle portion G3a3 is covered with the body 100 with no clearance therebetween. The middle portion G3a3 extends (is inclined) in an oblique direction including X- and Y'-direction components from the contact portion G3a1 to the connecting portion G3a2. The middle portion G3a3 is disposed on the X'-direction side relative to and in spaced relation to the middle portion G3b3 of the terminal G3b.

As illustrated in FIG. 3B and FIG. 4B, the first exposed portion G3a4 is a part in the Y-Y' direction (first part) of the terminal G3a and includes the entire area in the X-X' direction of the first part. The first exposed portion G3a4 is disposed on the X'-direction side relative to and in spaced relation to the first exposed portion G3b4 of the terminal G3b. As best illustrated in FIG. 2A, the first exposed portion G3a4 is exposed to the outside of the body 100 through the one and other first recesses 111 of the body 100.

As illustrated in FIG. 1A to FIG. 4B, terminals S2a and S2b are differential signal terminals being adjacent to each other and extending in the Y-Y' direction, and on the X'-direction side relative to the terminals S3a and S3b. The terminal S2a is located on the X'-direction side, and the terminal S2b is locate on the X-direction side. The terminals S2b and S2a respectively correspond to the one and other fifth terminals in the claims.

The terminal S2b includes a contact portion S2b1, a connecting portion S2b2, a middle portion S2b3, and a first exposed portion S2b4. The contact portion S2b1, similar in configuration to the contact portion S3b1, is disposed on the X'-direction side relative to and in spaced relation to the contact portion G3a1 of the terminal G3a. The connecting portion S2b2, similar in configuration to the connecting portion S3b2, is disposed on the X'-direction side relative to and in spaced relation to the connecting portion G3a2 of the terminal G3a. Accordingly, the connecting portion S2b2 is located on an oblique direction side including X- and Y'-direction components relative to the contact portion S2b1.

The middle portion S2b3 is provided between the contact portion S2b1 and the front portion of the connecting portion S2b2, connects the contact portion S2b1 to the connecting portion S2b2, and is held in the body 100. The middle portion S2b3 is covered with the body 100 with no clearance therebetween. The middle portion S2b3 extends (is inclined) in an oblique direction including X- and Y'-direction components from the contact portion S2b1 to the connecting portion S2b2. The middle portion S2b3 is disposed on the X'-direction side relative to and in spaced relation to the middle portion G3a3 of the terminal G3a. The inclination angle of the middle portion S2b3 relative to the contact portion S2b1 is smaller than that of the middle portions S3a3 and S3b3 relative to the contact portions S3a1 and S3b1, respectively.

As illustrated in FIG. 3B and FIG. 4B, the first exposed portion S2b4 is a part in the Y-Y' direction (first part) of the terminal S2b and includes the entire area in the X-X' direction of the first part. The first exposed portion S2b4 is disposed on the X'-direction side relative to and in spaced relation to the first exposed portion G3a4 of the terminal G3a. As best illustrated in FIG. 2A, the first exposed portion S2b4 is exposed to the outside of the body through the one and other first recesses 111 of the body 100.

The terminal S2a includes a contact portion S2a1, a connecting portion S2a2, a middle portion S2a3, and a first exposed portion S2a4. The contact portion S2a1, similar in configuration to the contact portion S3a1 of the terminal S3a, is disposed on the X'-direction side relative to and in spaced relation to the contact portion S2b1 of the terminal S2b. The connecting portion S2a2, similar in configuration to the connecting portion S3a2 of the terminal S3a, is disposed on the X'-direction side relative to and in spaced relation to the connecting portion S2b2 of the terminal S2b. Accordingly, the connecting portion S2a2 is located on an oblique direction side including X- and Y'-direction components relative to the contact portion S2a1. The connecting portion S2a2 is located at the same height as the contact portion S2a1.

The middle portion S2a3 is provided between the contact portion S2a1 and the front portion of the connecting portion S2a2, connects the contact portion S2a1 to the connecting portion S2a2, and is held in the body 100. The middle portion S2a3 is covered with the body 100 with no clearance therebetween. The middle portion S2a3 extends (is inclined) in an oblique direction including X- and Y'-direction components from the contact portion S2a1 to the connecting portion S2a2. The middle portion S2a3 is disposed on the X'-direction side relative to and in spaced relation to the middle portion S2b3 of the terminal S2b. The inclination angle of the middle portion S2b3 relative to the contact portion S2b1 is the same as that of the middle portion S2a3 relative to the contact portion S2a1.

As illustrated in FIG. 3B and FIG. 3B, the first exposed portion S2a4 is a part in the Y-Y' direction (first part) of the terminal S2a and includes the entire area in the X-X' direction of the first part. The first exposed portion S2a4 is disposed on the X'-direction side relative to and in spaced relation to the first exposed portion S2b4 of the terminal S2b. As best illustrated in FIG. 2A, the first exposed portion S2a4 is exposed to the outside of the body 100 through the one and other first recesses 111 of the body 100.

As illustrated in FIG. 1A to FIG. 4B, the terminal G2 extends in the Y-Y' direction to be located between the terminal S2a and the terminal S1b. The terminal G2 may be a ground terminal, or it may be a low-speed signal terminal adapted to transmit signals at a lower speed than the terminals S1a, S1b, S2a, and S2b. For example, the low-speed signal terminal may be a single-ended signal terminal, a power terminal, or a terminal of other functions adapted to transmit signals of frequency of at most $1/10$ or at most $1/100$ of the frequency of signals transmitted by the terminals S1a, S1b, S2a, and S2b. The terminal G2 corresponds to the seventh terminal in the claims.

The terminal G2 includes a contact portion G21, a connecting portion G22, a middle portion G23, a first exposed portion G24, a second exposed portion G25, a first unexposed portion G26, and a second unexposed portion G27. The contact portion G21 is similar in configuration to the contact portion G41 of the terminal G4. The contact portion G21 is disposed on the X'-direction side relative to and in spaced relation to the contact portion Kai of the terminal S2a.

The connecting portion G22 is similar in configuration to the connecting portion G42 of the terminal G4. The connecting portion G22 is disposed on the X'-direction side relative to and in spaced relation to the connecting portion S2a2 of the terminal S2a. Accordingly, the connecting portion G22 is located on an oblique direction side including X- and Y'-direction components relative to the contact portion G21. The connecting portion G22 is located at the same height as the contact portion G21.

The middle portion G23 is provided between the contact portion G21 and the front portion of the connecting portion G22, connects the contact portion G21 to the connecting portion G22, and is held in the body 100. The middle portion G23 is covered with the body 100 with no clearance therebetween. The middle portion G23 extends (is inclined) in an oblique direction including X- and Y'-direction components from the contact portion G21 to the connecting portion G22. The middle portion G23 is disposed on the X'-direction side relative to and in spaced relation to the middle portion S2a3 of the terminal S2a.

As illustrated in FIG. 3B and FIG. 4B, the first exposed portion G24 includes an area on the X-direction side of a part in the Y-Y' direction (first part) of the terminal G2. As best illustrated in FIG. 2A, the first exposed portion G24 is exposed to the outside of the body 100 through the one and other first recesses 111 of the body 100.

As illustrated in FIG. 3B and FIG. 4B, the first unexposed portion G26 includes an area on the X'-direction side of the first part of the terminal G2. In other words, in the first part of the terminal G2, the first unexposed portion G26 is on the X'-direction side relative to the first exposed portion G24. As best illustrated in FIG. 2A, the first unexposed portion G26 is held in the body 100. That is, the first unexposed portion G26 is covered with the body 100 with no clearance therebetween.

As illustrated in FIG. 3B and FIG. 4B, the second exposed portion G25 includes an area on the X'-direction side of a part (second part) on the Y-direction side relative to the first part of the terminal G2. As best illustrated in FIG. 2B, the second exposed portion G25 is exposed to the outside of the body 100 through the one and other third recesses 113 of the body 100.

As illustrated in FIG. 3B and FIG. 4B, the second unexposed portion G27 includes an area on the X-direction side of the second part of the terminal G2. In other words, in the second part of the terminal G2, the second unexposed portion G27 is on the X-direction side relative to the second exposed portion G25. As best illustrated in FIG. 2B, the second unexposed portion G27 is held in the body 100 and covered with the body 100 with no clearance therebetween.

The terminals S1a and S1b are differential signal terminals being adjacent to each other and extending in the Y-Y' direction, and on the X'-direction side relative to the terminals S2a and S2b. The terminal S1a is located on the X'-direction side, and the terminal S1b is located on the X-direction side. The terminals S1a and S1b correspond to the remaining fourth terminal in the claims.

The terminal S1b includes a contact portion S1b1, a connecting portion S1b2, a middle portion S1b3, and a first exposed portion S1b4. The contact portion S1b1, similar in configuration to the contact portion S3b1, is disposed on the X'-direction side relative to and in spaced relation to the contact portion G21 of the terminal G2. The connecting portion S1b2, similar in configuration to the connecting portion S3b2, is disposed on the X'-direction side relative to and in spaced relation to the connecting portion G22 of the terminal G2. Accordingly, the connecting portion S1b2 is located on a side in a direction including an X- and Y'-direction components (obliquely to the rear) relative to the contact portion S1b1. The connecting portion S1b2 is located at the same height as the contact portion S1b1.

The middle portion S1b3 is provided between the contact portion S1b1 and the front portion of the connecting portion S1b2, connects the contact portion S1b1 to the connecting portion S1b2, and is held in the body 100. The middle portion S1b3 is covered with the body 100 with no clearance therebetween. The middle portion S1b3 extends (is inclined) in an oblique direction including X- and Y'-direction components from the contact portion S1b1 to the connecting portion S1b2. The middle portion S1b3 is disposed on the X'-direction side relative to and in spaced relation to the middle portion G23 of the terminal G2. The inclination angle of the middle portion S1b3 relative to the contact portion S1b1 is smaller than that of the middle portions S2a3 and S2b3 relative to the contact portion S2a1 and S2b1, respectively. In other words, the middle portions S2a3 and S2b3 are more inclined to the X-direction side than the middle portion S1b3.

As illustrated in FIG. 3B and FIG. 4B, the first exposed portion S1b4 is a part in the Y-Y' direction (first part) of the terminal S1b and includes the entire area in the X-X' direction of the first part. The first exposed portion S1b4 is located on the X'-direction side relative to and in spaced relation to the second exposed portion G25. As best illustrated in FIG. 2B, the first exposed portion S1b4 is exposed to the outside of the body 100 at through the one and other third recesses 113 of the body 100.

The terminal S1a includes a contact portion S1a1, a connecting portion S1a2, a middle portion S1a3, and a first exposed portion S1a4. The contact portion S1a1, similar in configuration to the contact portion S3a1, is disposed on the X'-direction side relative to and in spaced relation to the contact portion S1b1. The connecting portion S1a2, similar in configuration to the connecting portion S3b2, is located on the X-direction side relative to and in spaced relation to the connecting portion S1b2. Accordingly, the connecting portion S1a2 is located on an oblique direction side including X- and Y'-direction components relative to the contact portion S1a1. The connecting portion S1a2 is located at the same height as the contact portion S1a1.

The middle portion S1a3 is provided between the contact portion S1a1 and the front portion of the connecting portion S1a2, connects the contact portion S1a1 to the connecting portion S1a2, and is held in the body 100. The middle portion S1a3 is covered with the body 100 with no clearance therebetween. The middle portion S1a3 extends (is inclined) in an oblique direction including X- and Y'-direction components from the contact portion S1a1 to the connecting portion S1a2. The middle portion S1a3 is located on the X'-direction side relative to and in spaced relation to the middle portion S1b3. The inclination angle of the middle portion S1a3 relative to the contact portion S1a1 is the same as that of the middle portion S1b3 relative to the contact portion S1b1.

As illustrated in FIG. 3B and FIG. 4B, the first exposed portion S1a4 is a part in the Y-Y' direction (first part) of the terminal S1a and includes the entire area in the X-X' direction of the first part. The first exposed portion S1a4 is located on the X'-direction side relative to and in spaced relation to the first exposed portion S1b4. As best illustrated in FIG. 2B, the first exposed portion S1a4 is exposed to the outside of the body 100 through the one and other third recesses 113 of the body 100.

The terminal G1 extends in the Y-Y' direction to be located on the X'-direction side relative to the terminal S1a. The terminal G1 may be a ground terminal, or it may be a low-speed signal adapted to transmit signals at a lower speed than the terminals S1b and S1a. For example, the low-speed signal terminal may be a single-ended signal terminal, a power terminal, or a terminal of other functions adapted to transmit signals of frequency of at most 1/10 or at most 1/100 of the frequency of signals transmitted by the terminals S1b and S1a. The terminal G1 corresponds to the remaining fourth terminal in the claims.

The terminal G1 includes a contact portion G11, a connecting portion G12, a middle portion G13, and a first exposed portion G14. The contact portion G11, similar in configuration to the contact portion G3b1, is disposed on the X'-direction side relative to and in spaced relation to the contact portion S1a1 of the terminal S1a. The connecting portion G12, similar in configuration to the connecting portion G3b2, is disposed on the X'-direction side relative to and in spaced relation to the connecting portion S1a2 of the terminal S1a. The connecting portion G12 is located on the Y'-direction side relative to the contact portion G11. The connecting portion G12 is located at the same height as the contact portion G11.

The middle portion G13 is provided between the contact portion G11 and the front portion of the connecting portion G12, connects the contact portion G11 to the connecting portion G12, and is held in the body 100. The middle portion G13 is covered with the body 100 with no clearance therebetween. The middle portion G13 extends in the Y' direction from the contact portion G11 to the connecting portion G12. The middle portion G13 is disposed on the X'-direction side relative to and in spaced relation to the middle portion S1a3 of the terminal S1a.

As illustrated in FIG. 3B and FIG. 4B, the first exposed portion G14 is a part in the Y-Y' direction (first part) of the terminal G1 and includes the entire area in the X-X' direction of the first part. The first exposed portion G14 is located on the X'-direction side relative to and in spaced relation to the first exposed portion S1a4 of the terminal S1a. As best illustrated in FIG. 2B, the first exposed portion G14 is exposed to the outside of the body 100 through the one and other third recesses 113 of the body 100.

The connector C may be manufactured using a first mold 10a and a second mold 10b as described below with reference to FIG. 5A and FIG. 5B. The first mold 10a includes a recess 11a, a first protrusion 12a, a second protrusion 13a, and a third protrusion 14a. The second mold 10b includes a recess 11b, a first protrusion 12b, a second protrusion 13b, and a third protrusion 14b.

Figure 5B:
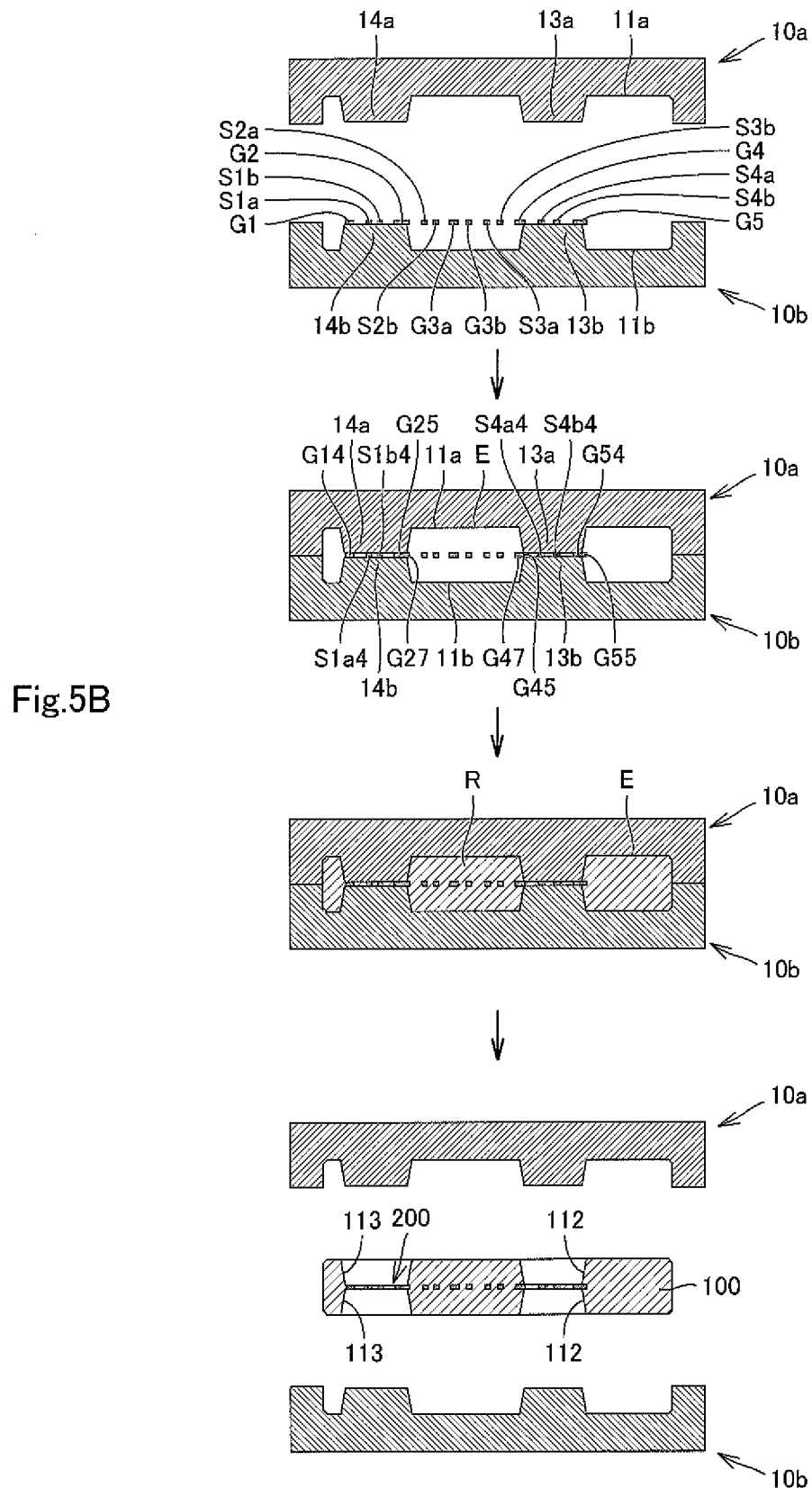
FIG. 5B is a schematic end view corresponding to FIG. 2B, illustrating steps of manufacturing the connector.

As illustrated in FIG. 5A to FIG. 5B, the recess 11a of the first mold 10a corresponds in shape to approximately half on the Z-direction side of the body 100. The recess 11b of the second mold 10b corresponds in shape to approximately the other half on the Z'-direction side of the body 100.

As illustrated in FIG. 5A, the first protrusion 12a of the first mold 10a is provided centrally on the ceiling of the recess 11a. The first protrusion 12a extends in the X-X' direction and has an external shape corresponding to the shape of the one of the first recesses 111 of the body 100. The first protrusion 12b of the second mold 10b is centrally on the bottom of the recess 11b. The first protrusion 12b extends in the X-X' direction and has an external shape corresponding to the shape of the other first recess 111 of the body 100.

As illustrated in FIG. 5B, the second protrusion 13a of the first mold 10a is provided on the ceiling of the recess 11a, particularly on an oblique direction side including the X- and Y-direction components relative to the first protrusion 12a. The second protrusion 13a extends in the X-X' direction and has an external shape corresponding to the shape of the one of the second recesses 112 of the body 100. Between the first protrusion 12a and the second protrusion 13a there is a gap (flow path) corresponding in shape to the one of the first separating portions 121 of the body 100. The second protrusion 13b of the second mold 10b is provided on the bottom of the recess 11b, particularly on an oblique direction side including the X- and Y-direction components relative to the first protrusion 12b. The second protrusion 13b extends in the X-X' direction and has an external shape conforming to the shape of the other second recess 112 of the body 100. Between the first protrusion 12b and the second protrusion 13b there is a gap (flow path) corresponding in shape to the other first separating portion 121 of the body 100.

As illustrated in FIG. 5B, the third protrusion 14a of the first mold 10a is provided on the ceiling of the recess 11a, particularly on an oblique direction side including the X'- and Y-direction components relative to the first protrusion 12a. The third protrusion 14a is located on the X'-direction side relative to and in spaced relation to the second protrusion 13a. The third protrusion 14a extends in the X-X' direction and has an external shape corresponding to the shape of the one of the third recesses 113 of the body 100. Between the first protrusion 12a and the third protrusion 14a there is a gap (flow path) corresponding in shape to the one second separating portion 122 of the body 100. The third protrusion 14b of the second mold 10b is provided on the bottom of the recess 11b, particularly on an oblique direction side including the K- and Y-direction components relative to the first protrusion 12b. The third protrusion 14b is located on the X'-direction side relative to and in spaced relation to the second protrusion 13b. The third protrusion 14b extends in the X-X' direction and has an external shape corresponding to the shape of the other third recess 113 of the body 100. Between the first protrusion 12b and the third protrusion 14b there is a gap (flow path) corresponding in shape to the other second separating portions 122 of the body 100.

A cavity E of the first mold 10a and the second mold 10b is defined by the recesses 11a and 11b, the first protrusions 12a and 12b, the second protrusions 13a and 13b, and the third protrusions 14a and 14b. The cavity E includes the above gaps.

A method of manufacturing the connector C using the first mold 10a and the second mold 10b will be described below with reference to FIG. 5A and FIG. 5B. First, the terminals of the terminal group 200 are prepared. The terminals are placed into the second mold 10b in the order G1, S1a, S1b, G2, S2a, S2b, G3a, G3b, S3a, S3b, G4, S4a, S4b, and G5 along the X-X' direction.

Then, the first mold 10a and the second mold 10b are closed. The terminals G1, S1a, S1b, G2, S2a, S2b, G3a, G3b, S3a, S3b, G4, S4a, S4b, and G5 are now partially housed in the cavity E of the first mold 10a and the second mold 10b in the arrangement as described below.

Specifically, as illustrated in FIG. 5A, the first protrusion 12a of the first mold 10a contacts from the Z-direction side with the first exposed portion G24 of the terminal G2, the first exposed portion S2a4 of the terminal S2a, the first exposed portion S2b4 of the terminal S2b, the first exposed portion G3a4 of the terminal G3a, the first exposed portion G3b4 of the terminal G3b, the first exposed portion S3a4 of the terminal S3a, the first exposed portion S3b4 of the terminal S3b, and the first exposed portion G44 of the terminal G4; and the first protrusion 12b of the second mold 10b contacts from the Z'-direction side with the first exposed portion G24 of the terminal G2, the first exposed portion S2a4 of the terminal S2a, the first exposed portion S2b4 of the terminal S2b, the first exposed portion G3a4 of the terminal G3a, the first exposed portion G3b4 of the terminal G3b, the first exposed portion S3a4 of the terminal S3a, the first exposed portion S3b4 of the terminal S3b, and the first exposed portion G44 of the terminal G4. As illustrated in FIG. 5B, the second protrusion 13a of the first mold 10a contacts from the Z-direction side with the second exposed portion G45 of the terminal G4, the first exposed portion S4a4 of the terminal S4a, the first exposed portion S4b4 of the terminal S4b, and the first exposed portion G54 of the terminal G5; the second protrusion 13b of the second mold 10b contacts from the Z'-direction side with the second exposed portion G45 of the terminal G4, the first exposed portion S4a4 of the terminal S4a, the first exposed portion S4b4 of the terminal S4b, and the first exposed portion G54 of the terminal G5; the third protrusion 14a of the first mold 10a contacts from the Z-direction side with the first exposed portion G14 of the terminal G1, the first exposed portion S1a4 of the terminal S1a, the first exposed portion S1b4 of the terminal S1b, and the second exposed portion G25 of the terminal G2; and the third protrusion 14b of the second mold 10b contacts from the Z'-direction side with the first exposed portion G14 of the terminal G1, the first exposed portion S1a4 of the terminal S1a, the first exposed portion S1b4 of the terminal S1b, and the second exposed portion G25 of the terminal G2.

Also when closing the molds, the following portions of the terminals are placed in midair in the cavity E: namely, the front portion of the connecting portion G12 and the middle portion G13 excluding the first exposed portion G14 of the terminal G1, the front portion of the connecting portion S1a2 and the middle portion S1a3 excluding the first exposed portion S1a4 of the terminal S1a, the front portion of the connecting portion S1b2 and the middle portion S1b3 excluding the first exposed portion S1b4 of the terminal S1b, the front portion of the connecting portion G22 and the middle portion G23 excluding the first and second exposed portions G24 and G25 (and including the first and second unexposed portions G26 and G27) of the terminal G2, the front portion of the connecting portion S2a2 and the middle portion S2a3 excluding the first exposed portion S2a4 of the terminal S2a, the front portion of the connecting portion S2b2 and the middle portion S2b3 excluding the first exposed portion S2b4 of the terminal S2b, the front portion of the connecting portion G3a2 and the middle portion G3a3 excluding the first exposed portion G3a4 of the terminal G3a, the front portion of the connecting portion G3b2 and the middle portion G3b3 excluding the first exposed portion G3b4 of the terminal G3b, the front portion of the connecting portion S3a2 and the middle portion S3a3 excluding the first exposed portion S3a4 of the terminal S3a, the front portion of the connecting portion S3b2 and the middle portion S3b3 excluding the first exposed portion S3b4 of the terminal S3b, the front portion of the connecting portion G42 and the middle portion G43 excluding the first and second exposed portions G44 and G45 (and including the first and second unexposed portions G46 and G47) of the terminal G4, the front portion of the connecting portion S4a2 and the middle portion S4a3 excluding the first exposed portion S4a4 of the terminal S4a, the front portion of the connecting portion S4b2 and the middle portion S4b3 excluding the first exposed portion S4b4 of the terminal S4b, and the front portion of the connecting portion G52 and the middle portion G53 excluding the first exposed portion G54 (and including the first unexposed portion G55) of the terminal G5. These portions of the terminals to be placed in midair in the cavity E may be referred to herein as inserted portions.

After the first mold 10a and the second mold 10b are closed, insulative plastic material R is injected into the cavity E. The injected plastic material R flows into the gap between the first protrusion 12a and the second protrusion 13a, the gap between the first protrusion 12b and the second protrusion 13b, the gap between the first protrusion 12a and the third protrusion 14a, and the gap between first protrusion 12b and the third protrusion 14b. The plastic material R is thus filled in the cavity E, with the inserted portions of the terminals G1, S1a, S1b, G2, S2a, S2b, G3a, G3b, S3a, S3b, G4, S4a, S4b, and G5 inserted in the plastic material R. In other words, the inserted portions of the terminals G1, S1a, S1b, G2, S2a, S2b, G3a, G3b, S3a, S3b, G4, S4a, S4b, and G5 are covered with the plastic material R with no clearance therebetween. The contact portions of the terminals G1, S1a, S1b, G2, S2a, S2b, G3a, G3b, S3a, S3b, G4, S4a, S4b, and G5 protrude in the Y direction out of the plastic material R. The rear portions of the connecting portions of the terminals G1, S1a, S1b, G2, S2a, S2b, G3a, G3b, S3a, S3b, G4, S4a, S4b, and G5 protrude in the Y' direction out of the plastic material R.

Then, the plastic material R in the cavity E hardens to become the body 100. At this time, the pair of first recesses 111 of the body 100 are made conforming to the external shapes of the first protrusions 12a and 12b, the pair of second recesses 112 are made conforming to the external shapes of the second protrusions 13a and 13b, and the pair of third recesses 113 are made conforming to the external shapes of the third protrusions 14a and 14b. The part of the plastic material R filled in the gap between the first protrusion 12a and the second protrusion 13a becomes the one of the first separating portions 121, and the part of the plastic material R filled in the gap between the first protrusion 12b and the second protrusion 13b becomes the other first separating portion 121. The part of the plastic material R filled in the gap between the first protrusion 12a and the third protrusion 14a becomes the one of the second separating portions 122, and the part of the plastic material R filled in the gap between first protrusion 12b and the third protrusion 14b becomes the other second separating portion 122. As a result, the inserted portions of the terminals G1, S1a, S1b, G2, S2a, S2b, G3a, G3b, S3a, S3b, G4, S4a, S4b, and G5 are held (insert-molded) in the body 100 at intervals along the X-X' direction.

Next, the first mold 10a and the second mold 10b are released. Then, the first protrusions 12a and 12b, the second protrusions 13a and 13b, and the third protrusions 14a and 14b of the first and second molds 10a and 10b are removed from the pair of first recesses 111, the pair of second recesses 112, and the pair of third recesses 113 of the body 100. Accordingly, the first exposed portion G24 of the terminal G2, the first exposed portion S2a4 of the terminal S2a, the first exposed portion S2b4 of the terminal S2b, the first exposed portion G3a4 of the terminal G3a, the first exposed portion G3b4 of the terminal G3b, the first exposed portion S3a4 of the terminal S3a, the first exposed portion S3b4 of the terminal S3b, and the first exposed portion G44 of the terminal G4 are exposed in the Z-Z' direction through the first recesses 111 of the body 100. The second exposed portion G45 of the terminal G4, the first exposed portion S4a4 of the terminal S4a, the first exposed portion S4b4 of the terminal S4b, and the first exposed portion G54 of the terminal G5 are exposed in the Z-Z' direction through the second recesses 112 of the body 100. The first exposed portion G14 of the terminal G1, the first exposed portion S1a4 of the terminal S1a, the first exposed portion S1b4 of the terminal S1b, and the second exposed portion G25 of the terminal G2 are exposed in the Z-Z' direction through the third recesses 113 of the body 100. The terminals of the terminal group 200 are now insert-molded in the body 100.

A case is also prepared. The body 100 and the terminals of the terminal group 200 are housed in the case. This is how to manufacture the connector C.

When a mating connector is inserted into the connection hole of the connector C, contact portions of the mating connector contact with the contact portions of the terminals of the connector C. This establishes connection between the mating connector and the connector C. The connecting portions of the terminals of the connector C can be brought into abutment with a circuit board or terminals of another connector. This establishes connection between the connector C and the circuit board or another connector.

The connector C and method of manufacturing the connector described above have at least the following technical features. First, it is possible to smooth the flow of the plastic material R injected into the cavity E of the first mold 10a and the second mold 10b to insert-mold the terminals of the terminal group 200 in the body 100. This is possible for the following reasons: in the first and second molds 10a, 10b as closed for molding the body 100 of the connector C, the gap between the first protrusions 12a, 12b and the second protrusions 13a, 13b and the gap between the first protrusions 12a, 12b and the third protrusions 14a, 14b serve as flow paths for the plastic material R. Moreover, the first protrusions 12a and 12b abut on the first exposed portion G24 of the terminal G2 and the first exposed portion G44 of the terminal G4, but they do not abut on the first unexposed portion G26 of the terminal G2 and the first unexposed portion G46 of the terminal G4. Accordingly, the first protrusions 12a and 12b can be downsized in the X-X' direction, as compared to the configuration that the first protrusions 12a and 12b abut on the first exposed portion G24, the first unexposed portion G26, the first exposed portion G44, and the first unexposed portion G46 (the first protrusions 12a and 12b abut on the entire areas in the X-X' direction of the first parts of the terminals G2 and G4). Also, the second protrusions 13a and 13b abut on the second exposed portion G45 of the terminal G4 but do not abut on the second unexposed portion G47 of the terminal G4. Accordingly, the second protrusions 13a and 13b can be downsized in the X-X' direction, as compared to the configuration in which the second protrusions 13a and 13b abut on the second exposed portion G45 and the second unexposed portion G47 (the second protrusions 13a and 13b abut on the entire area in the X-X' direction of the second part of the terminal G4). Also, the third protrusions 14a and 14b abut on the second exposed portion G25 of the terminal G2 but do not abut on the second unexposed portion G27 of the terminal G2. Accordingly, the third protrusions 14a and 14b can be downsized in the X-X' direction, as compared to the configuration that the third protrusions 14a and 14b abut on the second exposed portion G25 and the second unexposed portion G27 (the third protrusions 14a and 14b abut on the entire area in the X-X' direction of the second part of the terminal G1). It is thus possible to widen the gap between the first protrusions 12a, 12b and the second protrusions 13a, 13b and the gap between the first protrusions 12a, 12b and the third protrusions 14a, 14b, facilitating the flow of the plastic material R through the gaps. Further, the second protrusions 13a and 13b are disposed on a side of an oblique direction including the X- and Y-direction components relative to the first protrusions 12a and 12b, and the third protrusions 14a and 14b are disposed on a side of an oblique direction including the X'- and Y-direction components relative to the first protrusions 12a and 12b. Such a staggered arrangement of the plurality of protrusions facilitates the flow of the plastic material R to flow through the gaps between the protrusions.

Second, it is possible to reduce the possibility that the flow of the plastic material R may cause displacement of the terminals of the terminal group 200 for the following reasons. As described above, the terminals of the terminal group 200 housed in the cavity E of the first mold 10a and the second mold 10b are brought into abutment with at least one of the first protrusion 12a, the second protrusion 13a, and the third protrusion 14a of the first mold 10a from the Z-direction side, and with at least one of the first protrusion 12b, the second protrusion 13b, and the third protrusion 14b of the second mold 10b from the Z'-direction side.

Third, it is possible to equalize electromagnetic waves from the terminal S3a and electromagnetic waves from the terminal S3b to achieve impedance matching between the terminal S3a and the terminal S3b. It is similarly possible to equalize electromagnetic waves from the terminal S2a and electromagnetic waves from the terminal S2b, so as to match the impedances between the terminal S2a and the terminal S2b. This can be achieved with the configuration that the first exposed portion G44 of the terminal G4, the first exposed portion S3b4 of the terminal S3b, the first exposed portion S3a4 of the terminal S3a, the first exposed portion G3b4 of the terminal G3b, the first exposed portion G3a4 of the terminal G3a, the first exposed portion S2b4 of the terminal S2b, the first exposed portion S2a4 of the terminal S2a, and the first exposed portion G24 of the terminal G2 are arranged in this order and exposed through the first recesses 111 of the body 100. This configuration allows the first exposed portion G44 of the terminal G4 to absorb electromagnetic waves from the first exposed portion S3b4 of the terminal S3b, and the first exposed portion G3a4 of the terminal G3a to absorb electromagnetic waves from the first exposed portion S3a4 of the terminal S3a; and the first exposed portion G3b4 of the terminal G3b to absorb electromagnetic waves from the first exposed portion S2b4 of the terminal S2b, and the first exposed portion G24 of the terminal G2 to absorb electromagnetic waves from the first exposed portion S2a4 of the terminal S2a.

Fourth, it is possible to equalize electromagnetic waves from the terminal S4a and electromagnetic waves from the terminal S4b to achieve impedance matching between the terminal S4a and the terminal S4b. This can be achieved with the configuration that the first exposed portion G54 of the terminal G5, the first exposed portion S4b4 of the terminal S4b, the first exposed portion S4a4 of the terminal S4a, and the second exposed portion G45 of the terminal G4 are arranged in this order and exposed through the second recesses 112 of the body 100. This configuration allows the first exposed portion G54 of the terminal G5 to absorb electromagnetic waves from the first exposed portion S4b4 of the terminal S4b, and the second exposed portion G45 of the terminal G4 to absorb electromagnetic waves from the first exposed portion S4a4 of the terminal S4a.

Fifth, it is possible to equalize electromagnetic waves from the terminal S1a and electromagnetic waves from the terminal S1b to achieve impedance matching between the terminal S1a and the terminal S1b. This can be achieved with the configuration that the second exposed portion G25 of the terminal G2, the first exposed portion S1b4 of the terminal S1b, the first exposed portion S1a4 of the terminal S1a, and the first exposed portion G14 of the terminal G1 are arranged in this order and exposed through the third recesses 113 of the body 100. This configuration allows the first exposed portion G24 of the terminal G2 to absorb electromagnetic waves from the first exposed portion S1b4 of the terminal S1b, and the first exposed portion G14 of the terminal G1 to absorb electromagnetic waves from the first exposed portion S1a4 of the terminal S1a.

The above-described connector and method of manufacturing the connector are not limited to the embodiments but may be modified in any manner within the scope of the claims as detailed below.

The body of the invention may be any kind of body made of insulating plastic material that includes the first recess, the second recess, and the first separating portion of the above embodiment or of modification examples to be described.

The first recess of the invention may be modified in any manner as long as it extends in a direction including a component of the X-X' direction. The second recess of the invention may be modified in any manner as long as it extends in a direction including a component of the X-X' direction. For example, the first and second recesses of the body may each extend in an oblique direction including the X-X' direction and the Y-Y' direction, or extend in an oblique direction including the X-X' direction and the Z-Z' direction. The first and second recesses of the body may each be an arc-shaped, V-shaped, or zigzag-shaped recess extending in the direction including a component of the X-X' direction. Further, the first and second recesses of the body may be provided at any position of the body. More specifically, the first and second recesses of the body may be aligned along the X-X' direction or the Y-Y' direction. The second recess of the body may be provided on side of an oblique direction including the X-X' direction and the Y-Y' direction relative to the first recess in the body. The first and second recesses on the Z-direction side may be of different shape from those of the first and second recesses on the Z'-direction side. The first and second recesses of the body of any of the above aspects may be provided in the body on the Z-direction side or the Z'-direction side relative to the terminals of the terminal group of the above embodiment or of aspects described below.

The third recess of the body of the invention may be omitted. The third recess of the body of the invention may be modified in any manner as long as it extends in a direction including a component of the X-X' direction. The third recess of the body of the invention may be modified in shape in a similar manner to first and second recesses. Further, the third recess of the invention may be provided at any position of the body. For example, the third recess of the body may be aligned with the first or second recess in the X-X' direction or the Y-Y' direction. The third recess of the body may be provided on a side of an oblique direction including the X-X' direction relative to the first or second recess of the body, or on a side of an oblique direction including the Y-Y' direction relative to the first or second recess of the body (on one or the other side in the second direction relative to the first recess). The third recess on the Z-direction side may be of different shape from that of the third recess on the Z'-direction side. The third recess of the body of any of the above aspects may be provided in the body on the Z-direction side or the Z'-direction side relative to the terminals of the terminal group of the above embodiment or of aspects described below.

The first separating portion of the body of the invention may be modified in any manner as long as it is part of the insulating plastic material forming the body and located between the first recess of any of the above aspects and the second recess of any of the above aspects. That is, the body includes at least one first separating portion. The body of the invention may be formed with at least one second separating portion or without any second separating portion. If provided, the second separating portion of the body of the invention may be modified in any manner as long as it is part of the insulating plastic material forming the body and is located between the first recess of any of the above aspects and the third recess of any of the above aspects.

The terminal group of the invention may be modified in any manner as long as it is at least partially held in the body of any of the above aspects and includes a pair of first terminals, a second terminal, a third terminal, and a fourth terminal spaced from each other along the X-X' direction. At least one of the pair of first terminal, the second terminal, the third terminal, and the fourth terminal may extend at a different height from other terminals, or all of the terminals may extend at different heights.

The pair of first terminals of the invention may any differential signal terminals being adjacent to each other and extending in a direction including a component of a direction crossing the X-X' direction (in a direction including a component of the second direction) and each including a first exposed portion. For example, the first terminals may extend in a linear or arcuate shape in a direction crossing the X-X' direction, or may extend in a linear or arcuate shape in an oblique direction including a component of a direction crossing the X-X' direction. The first exposed portion of each first terminal of the invention may be modified in any manner as long as it includes the entire area in the X-X' direction of a part in the second direction (first part) of the first terminal and is exposed to the outside of the body of any of the above aspects through the first recess of any of the above aspects. The first exposed portion of each first terminal of the invention may be provided in the connecting portion or the contact portion of the first terminal.

The second terminal of the invention may be a ground terminal extending in a direction including a component of the second direction or a low-speed signal terminal extending in a direction including a component of the second direction to transmit a signal at a lower speed than the first terminals. In either case, the second terminal of the invention may be modified in any manner as long as it is located next to one of the first terminals on one side in the X-X' direction and includes a first unexposed portion and a first exposed portion. For example, the second terminal may extend in a linear or arcuate shape in a direction crossing the X-X' direction, or may extend in a linear or arcuate shape in an oblique direction including a component of a direction crossing the X-X' direction. The first unexposed portion of the second terminal of the invention may be modified in any manner as long as it includes an area on one side in the X-X' direction of a part in the second direction (first part) of the second terminal and is covered with the body of any of the above aspects. The first exposed portion of the second terminal of the invention may be modified in any manner as long as it includes an area on the other side in the X-X' direction of the first part of the second terminal and is exposed to the outside of the body of any of the above aspects through the first recess of any of the above aspects. The first unexposed portion and the first exposed portion of the second terminal of the invention may be provided in the connecting portion or the contact portion of the second terminal.

The second exposed portion and the second unexposed portion of the second terminal of the invention may be omitted. The second exposed portion of the second terminal of the invention may be modified in any manner as long as it includes at least an area on the one side in the X-X' direction of a part (second part) of the second terminal, the second part being on the one side in the second direction relative to the part (first part) of the second terminal, and as long as the second exposed portion is exposed to the outside of the body of any of the above aspects through the second recess of any of the above aspects. For example, the second exposed portion of the second terminal of the invention may include the entire area in the X-X' direction of the second part of the second terminal. In this case, the second unexposed portion of the second terminal is omitted. The second unexposed portion of the second terminal of the invention may be modified in any manner as long as it includes an area on the other side in the X-X' direction of the part (second part), the second part being on the one side in the second direction relative to the part (first part) of the second terminal, and as long as the second unexposed portion is covered with the body of any of the above aspects.

The third terminal of the invention may be a ground terminal extending in a direction including a component of the second direction or a low-speed signal terminal extending in a direction including a component of the second direction to transmit a signal at a lower speed than the first terminals. In either case, the third terminal of the invention may be modified in any manner as long as it is located next to the other first terminal on the other side in the X-X' direction and includes a first exposed portion. For example, the third terminal may extend in a linear or arcuate shape in a direction crossing the X-X' direction, or may extend in a linear or arcuate shape in an oblique direction including a component of a direction crossing the X-X' direction. The first exposed portion of the third terminal of the invention may be modified in any manner as long as it has at least an area on the one side in the X-X' direction of a part in the second direction (first part) of the third terminal and is exposed to the outside of the body of any of the above aspects through the first recess of any of the above aspects.

The first exposed portion of the third terminal may be provided in the connecting portion or the contact portion of the third terminal. In the case where the first exposed portion of the third terminal includes the area on the one side in the X-X' direction of the part of the third terminal, the third terminal may further include a first unexposed portion that includes an area on the other side in the X-X' direction of the part in the second direction of the third terminal and is covered with the body of any of the above aspects.

At least one fourth terminal may be provided in the invention. The at least one fourth terminal of the invention may be modified in any manner as long as it extends in a direction including a component of the second direction, is disposed on the one side in the X-X' direction relative to the second terminal of any of the above aspects, and includes a first exposed portion. The fourth terminal may extend in a linear or arcuate shape in a direction crossing the X-X' direction, or may extend in a linear or arcuate shape in an oblique direction including a component of a direction crossing the X-X' direction. The fourth terminal may be a signal terminal, a ground terminal, a power terminal, or a terminal of other functions. The first exposed portion of the fourth terminal of the invention may be modified in any manner as long as it includes the entire area or a partial area in the X-X' direction of a part in the second direction of the fourth terminal and is exposed to the outside of the body of any of the above aspects through the second or third recess of any of the above aspects. The first exposed portion of the fourth terminal may be provided is the connecting portion or the contact portion of the fourth terminal. In the case where the first and second recesses are adjacent to each other in the X-X' direction, the first exposed portion of the fourth terminal and the first exposed portion of the second terminal may also be adjacent to each other in the X-X' direction.

The pair of fifth terminals, the sixth terminal, and the seventh terminal of the invention may be omitted. The fifth terminals of the invention may be modified in any manner as long as they are differential signal terminals being adjacent to each other and extending in a direction including a component of the second direction, and as long as they each include a first exposed portion. The fifth terminals may extend in a linear or arcuate shape in a direction crossing the X-X' direction, or may extend in a linear or arcuate shape in an oblique direction including a component of a direction crossing the X-X' direction. The first exposed portion of the fifth terminal of the invention may be modified in any manner as long as it includes the entire area in the X-X' direction of a part in the second direction of the fifth terminal and is exposed to the outside of the body of any of the above aspects through the first recess of any of the above aspects. The first exposed portion of the fifth terminal may be provided in the connecting portion or the contact portion of the fifth terminal.

The sixth terminal of the invention may be a ground terminal extending in a direction including a component of the second direction or a low-speed signal terminal extending in a direction including a component of the second direction to transmit a signal at a lower speed than the first terminals and the fifth terminals. In either case, the sixth terminal of the invention may be modified in any manner as long as it is located between one of the fifth terminals on the one side in the X-X' direction and the third terminal, and as long as it includes a first exposed portion. The sixth terminal may extend in a linear or arcuate shape in a direction crossing the X-X' direction, or may extend in a linear or arcuate shape in an oblique direction including a component of a direction crossing the X-X' direction. The first exposed portion of the sixth terminal of the invention may be modified in any manner as long as it includes the entire area on the one side in the X-X' direction of a part in the second direction of the sixth terminal and is exposed to the outside of the body of any of the above aspects through the first recess of any of the above aspects. The first exposed portion of the sixth terminal may be provided in the connecting portion or the contact portion of the sixth terminal. In the case where the sixth terminal is omitted, the third terminal of any of the above aspects may be disposed between the other first terminal and the one of the fifth terminals. In this case, the first exposed portion of the third terminal may preferably include the entire area in the X-X' direction of the part of the third terminal.

The seventh terminal of the invention may be a ground terminal extending in a direction including a component of the second direction or a low-speed signal terminal extending in a direction including a component of the second direction to transmit a signal at a lower speed than the first terminals. In either case, the seventh terminal of the invention may be modified in any manner as long as it is located next to the other fifth terminal on the other side in the X-X' direction, and as long as it includes a first exposed portion and a first unexposed portion. The seventh terminal may extend in a linear or arcuate shape in a direction crossing the X-X' direction, or may extend in a linear or arcuate shape in an oblique direction including a component of a direction crossing the X-X' direction. The first exposed portion of the seventh terminal of the invention may be modified in any manner as long as it includes an area on the one side in the X-X' direction of a part (first part) in the second direction of the seventh terminal and is exposed to the outside of the body of any of the above aspects through the first recess of any of the above aspects. The first unexposed portion of the seventh terminal of the invention may be modified in any manner as long as it includes an area on the other side in the X-X' direction of the first part of the seventh terminal and is covered with the body of any of the above aspects. The first exposed portion and the first unexposed portion of the seventh terminal may be provided in the connecting portion or the contact portion of the seventh terminal.

The second exposed portion and the second unexposed portion of the seventh terminal of the invention may be omitted. The second exposed portion of the seventh terminal of the invention may be modified in any manner as long as it includes at least an area on the other side in the X-X' direction of a part (second part) on the one side in the second direction relative to the part (first part) of the seventh terminal, and is exposed to the outside of the body of any of the above aspects through the third recess of any of the above aspects. For example, the second exposed portion of the seventh terminal of the invention may include the entire area in the X-X' direction of the second part of the seventh terminal. In this case, the second unexposed portion of the seventh terminal is omitted. The second unexposed portion of the seventh terminal of the invention may be modified in any manner as long as it includes an area on the one side in the X-X' direction of a part (second part) of the seventh terminal, the second part being on the one side in the second direction relative to the part (first part) of the seventh terminal, and as long as the second unexposed portion is covered with the body of any of the above aspects.

The first mold of the invention may be modified in any manner as long as it includes first and second protrusions and a gap between the first and second protrusions. The first protrusion of the first mold of the invention may be modified in any manner as long as it can abut on an area on the other side in the X-X' direction of the part in the second direction of the second terminal of any of the above aspects, the entire area in the X-X' direction of the part in the second direction of each first terminal of any of the above aspects, and an area on the one side in the X-X' direction of the part in the second direction of the third terminal of any of the above aspects. The first protrusion of the first mold may be of any shape and/or at any position corresponding to the shape and/or position of the first recess of the body of any of the above aspects. The second protrusion of the first mold of the invention may be modified in any manner as long as it can abut on the entire area or a partial area of the part in the second direction of the fourth terminal of any of the above aspects. In other words, the second protrusion of the first mold of the invention may not abut on the second terminal. The second protrusion of the first mold may be of any shape and/or at any position corresponding to the shape and/or position of the second recess of the body of any of the above aspects. The first and/or second protrusions of any of the above aspects may be provided in a recess of the first mold, on a flat face of the first mold, or on a convex base of the first mold. The first mold of any of the above aspects may consist of a plurality of parts.

The third protrusion of the first mold of the invention may be omitted. The third protrusion of the first mold of the invention may be modified in any manner as long as it can abut on the entire area or a partial area of the part in the second direction of the fourth terminal of any of the above aspects. In other words, the third protrusion of the first mold of the invention may not to abut on the seventh terminal. The third protrusion of first mold may be of any shape and/or at any position corresponding to the shape and/or position of the third recess of the body of any of the above aspects. The third protrusion of any of the above aspects may be provided in a recess, on a flat face, or on a base of the first mold.

The second mold of the invention may be modified in any manner as long as the first and second mold can be closed together. For example, the second mold may have a recess to communicate with the recess of the first mold, a flat face to close the recess of the first mold, or a convex base to be inserted into the recess of the first mold. The first and second protrusions and/or the third protrusion of the second mold of the invention may be omitted. The first and second protrusions of the second mold of the invention may be modified in a similar manner to the first and second protrusions of the first mold. The first and second protrusions of the second mold may be provided in a recess, on a flat face, or on a base of the second mold. The third protrusion of the second mold of the invention may be modified in a similar manner to the third protrusion of the first mold. The third protrusion of the second mold may be provided in a recess, on a flat face, or on a base of the second mold. The second mold of any of the above aspects may consist of a plurality of parts.

The method of manufacturing the connector of the invention may be any method including placing into a first or second mold a plurality of terminals in spaced relation to each other in the X-X' direction, the terminals including a pair of first terminals, a second terminal, a third terminal, and a fourth terminal; closing the first and second molds so that the terminals are housed at least partially in a cavity of the first and second molds; injecting plastic material into the cavity so that the terminals are at least partially inserted in the plastic material; hardening the plastic material in the cavity; and taking out the plastic material and the terminals from the first and second molds. The placing of the terminals includes placing the pair of first terminals adjacent to each other, placing the second terminal next to one of the first terminals on one side in the X-X' direction, placing the third terminal next to the other first terminal on the other side in the X-X' direction, and placing the fourth terminal on the one side in the X-X' direction relative to the second terminal. The closing of the first and second molds includes abutting a first protrusion of the first mold on an area on the other side in the X-X' direction of a part in the second direction of the second terminal, the entire areas in the X-X' direction of parts in the second direction of the first terminals, and an area on the one side in the X-X' direction of a part in the second direction of the third terminal, and abutting a second protrusion of the first mold on the entire area or a partial area of a part in the second direction of the fourth terminal. The second direction of the terminals should cross the X-X' direction. The injecting of the plastic material should include making the plastic material flow through a gap between the first protrusion and the second protrusion.

In abutting the second protrusion of the first mold, the second protrusion may also abut on an entire area in the X-X' direction of a part (second part) on one side in the second direction relative to the part (first part) of the second terminal.

In the case where the second mold does not include the first protrusion, the second protrusion, or the third protrusion as described above, the closing of the first and second molds may preferably include abutting the first and second protrusions of the first mold as described above, and abutting the second mold on the second, first, and third terminals from the opposite side to the first mold.

In the case where the sixth terminal is omitted as described above, the terminals may include a pair of fifth terminals and a seventh terminal. In this case, the placing of the terminals may preferably include placing the fifth terminals adjacent to each other, placing the third terminal between one of the fifth terminals on the one side in the first direction and the other first terminal, and placing the seventh terminal next to the other fifth terminal on the other side in the X-X' direction. Further, the abutting of the first protrusion of the first mold may preferably include abutting the first protrusion of the first mold on the area on the other side in the X-X' direction of the part in the second direction of the second terminal, the entire areas in the X-X' direction of the parts in the second direction of the first terminals, the entire area in the X-X' direction of the part in the second direction of the third terminal, entire areas in the X-X' direction of parts in the second direction of the fifth terminals, and an area on the one side in the X-X' direction of a part in the second direction of the seventh terminal. The abutting of the first protrusion of the second mold may preferably include abutting the first protrusion of the second mold, from the opposite side to the first protrusion of the first mold, on the area on the other side in the X-X' direction of the part in the second direction of the second terminal, the entire areas in the X-X' direction of the parts in the second direction of the first terminals, the entire area of the X-X' direction of the part in the second direction of the third terminal, the entire areas in the first direction of parts in the second direction of the fifth terminals, and an area on the one side in the X-X' direction of a part in the second direction of the seventh terminal. The manufacturing method may not include abutting the first protrusion of the second mold.

It should be appreciated that the embodiments and modifications thereof are described above by way of examples only. The materials, shapes, dimensions, numbers, arrangements, and other configurations of the constituents of the connector and the method of manufacturing the connector may be modified in any manner if they can perform similar functions. The configurations of the embodiments and the modifications described above may be combined in any possible manner. The first direction (X-X' direction) of the invention may be any direction along which the terminals of the above embodiment or the modification examples are arranged at intervals. The second direction (the Y-Y' direction or the second direction) of the invention may any direction crossing the first direction. The third direction (Z-Z' direction) of the invention may be any direction crossing the first direction and the second direction. In each of the first, second, and third directions of the invention, either side of each direction may be the one or other side of the direction, and the other side may be the other side of the direction.

REFERENCE SIGNS LIST

C: Connector
100: Body
101: First area
102: Second area
103: Third area
111: First recess
112: Second recess
113: Third recess
121: First separating portion
122: Second separating portion
200: Terminal group
S1$a$, S1$b$: Terminal (Fourth terminal)
S1$a$1, S1$b$1: Contact portion
S1$a$2, S1$b$2: Connecting portion
S1$a$3, S1$b$3: Middle portion
S1$a$4, S1$b$4: First exposed portion
S2$a$, S2$b$: Terminal (Fifth terminal)
S2$a$1, S2$b$1: Contact portion
S2$a$2, S2$b$2: Connecting portion
S2$a$3, S2$b$3: Middle portion
S2$a$4, S2$b$4: First exposed portion
S3$a$, S3$b$: Terminal (First terminal)
S3$a$1, S3$b$1: Contact portion
S3$a$2, S3$b$2: Connecting portion
S3$a$3, S3$b$3: Middle portion
S3$a$4, S3$b$4: First exposed portion
S4$a$, S4$b$: Terminal (Fourth terminal)
S4$a$1, S4$b$1: Contact portion
S4$a$2, S4$b$2: Connecting portion
S4$a$3, S4$b$3: Middle portion
S4$a$4, S4$b$4: First exposed portion
G1: Terminal (Fourth terminal)
G11: Contact portion
G12: Connecting portion
G13: Middle portion
G14: First exposed portion
G2: Terminal (Seventh terminal)
G21: Contact portion
G22: Connecting portion
G23: Middle portion
G24: First exposed portion
G25: Second exposed portion
G26: First unexposed portion
G27: Second unexposed portion
G3$a$, G3$b$: Terminal (Sixth terminal, Third terminal)
G3$a$1, G3$b$1: Contact portion
G3$a$2, G3$b$2: Connecting portion
G3$a$3, G3$b$3: Middle portion
G3$a$4, G3$b$4: First exposed portion
G4: Terminal (Second terminal)

G41: Contact portion
G42: Connecting portion
G43: Middle portion
G44: First exposed portion
G45: Second exposed portion
G46: First unexposed portion
G47: Second unexposed portion
G5: Terminal (Fourth terminal)
G51: Contact portion
G52: Connecting portion
G53: Middle portion
G54: First exposed portion
G55: First unexposed portion
10a, 10b: First and second molds
11a, 11b: Recess
E: Cavity
12a, 12b: First protrusion
13a, 13b: Second protrusion
14a, 14b: Third protrusion

The invention claimed is:

1. An electrical connector, comprising:
terminals, wherein the terminals include a pair of first terminals, a second terminal, a third terminal, and a fourth terminal spaced from each other along a first direction, the first direction being an arraying direction of the first, second, third, and fourth terminals, the first terminals being differential signal terminals being elongated in a second direction and adjacent to each other in the first direction, the second direction crossing the first direction, the second terminal being a ground terminal elongated in the second direction or a low-speed signal terminal elongated in the second direction to transmit a signal at a lower speed than the first terminals, the second terminal being located next to one of the first terminals on one side in the first direction, the third terminal being a ground terminal elongated in the second direction or a low-speed signal terminal elongated in the second direction to transmit a signal at a lower speed than the first terminals, the third terminal being located next to the other first terminal on the other side in the first direction, the fourth terminal being elongated in the second direction and located on the one side in the first direction relative to the second terminal; and
a body of an insulating plastic material, the body holding the arrayed first, second, third, and fourth terminals at least partially and including a first recess, a second recess, a first separating portion, and a first face on one side in a third direction, the third direction being a thickness direction of the body and crossing the first direction and the second direction, wherein
the first recess opens through the first face of the body and crosses the first terminals,
the second recess opens through the first face of the body,
the first separating portion is located between the first recess and the second recess,
the first terminals each include a first exposed portion,
the first exposed portion of each first terminal is a portion in the second direction of the first terminal, extends from one end to the other end in the first direction of the first terminal, and is exposed to an outside of the body through the first recess thereof,
the second terminal includes a first part that is a portion in the second direction of the second terminal and that extends from one end to the other end in the first direction of the second terminal,
the first part of the second terminal includes a first unexposed portion and a first exposed portion,
the first unexposed portion of the second terminal is an area on one side in the first direction of the first part of the second terminal and is covered with the body so as not to be exposed out of the body,
the first exposed portion of the second terminal is an area on the other side in the first direction of the first part of the second terminal and is exposed to the outside of the body through the first recess thereof,
the third terminal includes a first part that is a portion in the second direction of the third terminal and that extends from one end to the other end in the first direction of the third terminal,
the first part of the third terminal includes a first exposed portion,
the first exposed portion of the third terminal includes at least an area on one side in the first direction of the first part of the third terminal and is exposed to the outside of the body through the first recess thereof,
the fourth terminal includes a first part that is a portion in the second direction of the fourth terminal and that extends from one end to the other end in the first direction of the fourth terminal,
the first part of the fourth terminal includes a first exposed portion,
the first exposed portion of the fourth terminal includes an entire or partial area in the first direction of the first part of the fourth terminal and is exposed to the outside of the body through the second recess thereof.

2. The electrical connector according to claim 1, wherein the second recess is provided on one side in the second direction relative to and in spaced relation to the first recess of the body.

3. The electrical connector according to claim 2, wherein the second terminal further includes a second part being another portion in the second direction of the second terminal, the second part being located on the one side in the second direction relative to the first part of the second terminal,
the second part of the second terminal extends from the one end to the other end in the first direction of the second terminal and includes a second exposed portion, and
the second exposed portion includes at least an area of the second part of the second terminal, and the second exposed portion is exposed to the outside of the body through the second recess thereof.

4. The electrical connector according to claim 1, wherein the body further includes a first thickness portion, a second thickness portion, and a second face on the other side in the third direction,
the first thickness portion is a portion of the body on one side of the third direction relative to the first, second, and third terminals,
the second thickness portion is a portion of the body on another side of the third direction relative to the first, second, and third terminals,
the first recess comprises top and bottom first recesses,
the top first recess passes through the first thickness portion of the body, from the first, second, and third terminals to the first face of the body, and
the bottom first recess passes through the second thickness portion of the body, from the first, second, and third terminals to the second face of the body.

5. The electrical connector according to claim 4, wherein
the body further includes a third thickness portion and a fourth thickness portion,
the third thickness portion is a portion of the body on one side of the third direction relative to the fourth terminal,
the fourth thickness portion is a portion of the body on another side of the third direction relative to the fourth terminal,
the second recess comprises top and bottom second recesses,
the top second recess passes through the third thickness portion of the body, from the fourth terminal to the first face of the body, and the bottom second recess passes through the fourth thickness portion of the body, from the fourth terminal to the second face of the body,
the first separating portion comprises top and bottom first separating portions, and
the top first separating portion is located between the top first recess and the top second recess, and the bottom first separating portion is located between the bottom first recess and the bottom second recess.

6. The electrical connector according to claim 4, wherein the body further comprises:
a third recess opening to the first face of the body and extending in a direction including a component of the first direction, and
a second separating portion between the first recess and the third recess, wherein
the fourth terminal comprises a plurality of fourth terminals including at least one of the fourth terminals and a remaining fourth terminal, the at least one of the fourth terminals being disposed on the one side in the first direction relative to the second terminal,
the first exposed portion of the at least one of the fourth terminals is exposed to the outside of the body through the second recess thereof, and
the first exposed portion of the remaining fourth terminal is exposed to the outside of the body through the third recess thereof.

7. The electrical connector according to claim 6, wherein
the third recess is provided in the body on one of one side and another side of the second direction relative to the first recess, and
the first and third recesses are not oriented along the second direction.

8. The electrical connector according to claim 6, wherein
the body further includes a fifth thickness portion and a sixth thickness portion,
the fifth thickness portion is a portion of the body on one side of the third direction relative to the remaining fourth terminal,
the sixth thickness portion is a portion of the body on another side of the third direction relative to the remaining fourth terminal,
the third recess comprises top and bottom third recesses, the top third recess passing through the fifth thickness portion of the body, from the remaining fourth terminal to the first face of the body, and the bottom third recess passing through the sixth thickness portion of the body, from the remaining fourth terminal to the second face of the body, and
the second separating portion comprises top and bottom second separating portions, the top second separating portion being located between the top first recess and the top third recess, and the bottom separating portion being located between the bottom first recess and the bottom third recess.

9. The electrical connector according to claim 1, further comprising a pair of fifth terminals, a sixth terminal, and a seventh terminal, wherein
the fifth terminals are differential signal terminals being elongated in the second direction and adjacent to each other in the first direction,
the sixth terminal is a ground terminal elongated in the second direction or a low-speed signal terminal elongated in the second direction to transmit a signal at a lower speed than the first and fifth terminals, the sixth terminal being located between one of the fifth terminals on one side in the first direction and the third terminal,
the seventh terminal is a ground terminal elongated in the second direction or a low-speed signal terminal elongated in the second direction to transmit a signal at a lower speed than the first terminals, the seventh terminal being located next to the other fifth terminal on the other side in the first direction,
first recess crosses the first, third, fifth, and sixth terminals,
the first exposed portion of the third terminal is an entire area in the first direction of the first part of the third terminal,
the fifth terminals each includes a first exposed portion,
the first exposed portion of each fifth terminal is a portion in the second direction of the fifth terminal, extends from one end to the other end in the first direction of the fifth terminal, and is exposed to the outside of the body through the first recess thereof,
the sixth terminal includes a first exposed portion,
the first exposed portion of the sixth terminal is a portion in the second direction of the sixth terminal, extends from one end to the other end in the first direction of the sixth terminal, and is exposed to the outside of the body through the first recess thereof,
the seventh terminal includes a first part that is a portion in the second direction of the seventh terminal and extends from one end to the other end in the first direction of the seventh terminal,
the first part of the seventh terminal includes a first exposed portion and a first unexposed portion,
the first exposed portion of the seventh terminal is an area on one side of the first direction of the first part of the seventh terminal and is exposed to the outside of the body through the first recess thereof, and
the first unexposed portion of the seventh terminal is an area on another side of the first direction of the first part of the seventh terminal and is covered with the body so as not to be exposed out of the body.

10. The electrical connector according to claim 1, further comprising a pair of fifth terminals and a seventh terminal, wherein
the fifth terminals are differential signal terminals being elongated in the second direction and adjacent to each other in the first direction,
the third terminal is disposed between the other first terminal and one of the fifth terminals on one side of the first direction,
the seventh terminal is a ground terminal elongated in the second direction or a low-speed signal terminal elongated in the second direction to transmit a signal at a lower speed than the first terminals, the seventh terminal being located next to the other fifth terminal on another side of the first direction, the first recess crosses the first, third, and fifth terminals, the first exposed portion of the third terminal is an entire area in the first direction of the first part of the third terminal, the fifth terminals each includes a first exposed portion, the first exposed portion of each fifth terminal is a portion in the second direction of the fifth terminal, extends from one end to the other end in the first direction of the fifth terminal, and is exposed to the outside of the body through the first recess thereof, the seventh terminal includes a first part that is a portion in the second direction of the seventh terminal and extends from one end to the other end in the first direction of the seventh terminal, the first part of the seventh terminal includes a first exposed portion and a first unexposed portion, the first exposed portion of the seventh terminal is an area on one side of the first direction of the first part of the seventh terminal and is exposed to the outside of the body through the first recess thereof, and the first unexposed portion of the seventh terminal is an area on another side of the first direction of the first part of the seventh terminal and is covered with the body so as not to be exposed out of the body.

11. The electrical connector according to claim 1, wherein the first exposed portion of each first terminal is exposed to an outside of the body only through the first recess thereof, the first exposed portion of the second terminal is exposed to the outside of the body only through the first recess thereof, the first exposed portion of the third terminal is exposed to the outside of the body only through the first recess thereof, the first exposed portion of the fourth terminal is exposed to the outside of the body only through the second recess thereof, and the first and third terminals are not exposed to the outside of the body through the second recess thereof.

12. The electrical connector according to claim 11, wherein the second terminal further includes a second part being another portion in the second direction of the second terminal, the second part being located on the first side in the second direction relative to the first part of the second terminal, the second part of the second terminal extends from the one end to the other end in the first direction of the second terminal and includes a second exposed portion and a second unexposed portion, the second exposed portion is in an area on the one side in the first direction of the second part of the second terminal, the second part being on the one side in the second direction relative to the first part of the second terminal, the second exposed portion is exposed to the outside of the body only through the second recess thereof, and the second unexposed portion is in an area on the other side in the first direction of the second part of the second terminal and is covered with the body so as not to be exposed out of the body.

13. The electrical connector according to claim 1, wherein the third direction crosses the first and second directions at right angles.

14. The electrical connector according to claim 1, wherein the first recess extends in the first direction, in an oblique direction including the first and second directions, or in an oblique direction including the first and third directions, and the second recess extends in the first direction, in an oblique direction including the first and second directions, or in an oblique direction including the first and third directions.

15. The electrical connector according to claim 14, wherein the first recess is arc-shaped, V-shaped, or zigzag-shaped, and the second recess is arc-shaped, V-shaped, or zigzag-shaped.

* * * * *